United States Patent [19]

Ohya et al.

[11] Patent Number: 4,700,376
[45] Date of Patent: Oct. 13, 1987

[54] AUTOMATIC TELEPHONE ANSWERING APPARATUS WITH REMOTE CONTROL SIGNAL MUTING

[75] Inventors: Hiroshi Ohya; Nobuo Terui, both of Tokyo, Japan

[73] Assignee: Olympus Optical Co., Ltd., Tokyo, Japan

[21] Appl. No.: 693,269

[22] Filed: Jan. 22, 1985

[30] Foreign Application Priority Data

Jan. 31, 1984 [JP] Japan ................... 59-15321
Jan. 31, 1984 [JP] Japan ................... 59-15322
Jan. 31, 1984 [JP] Japan ................... 59-15323
Jan. 31, 1984 [JP] Japan ................... 59-15324
Jan. 31, 1984 [JP] Japan ................... 59-15325
Oct. 2, 1984 [JP] Japan ................. 59-2066660
Oct. 2, 1984 [JP] Japan ............... 59-149287[U]
Oct. 19, 1984 [JP] Japan ............... 59-158197[U]

[51] Int. Cl.$^4$ ................................... H04M 1/64
[52] U.S. Cl. ........................... 379/77; 379/74
[58] Field of Search ............ 179/6.03, 6.05, 6.07–6.09, 179/6.11, 6.18

[56] References Cited

U.S. PATENT DOCUMENTS 3,920,910 11/1975 Urayama .
4,049,916 9/1977 Danner .
4,304,968 12/1981 Klausner et al. .
4,328,397 5/1982 Chamberlin ................. 179/6.09
4,400,586 8/1983 Hanscom ..................... 179/6.07
4,438,296 3/1984 Smith ........................ 179/6.08
4,521,647 6/1985 Olson et al. ................ 179/6.11
4,549,045 10/1985 Castro et al. ............... 179/6.07
4,556,761 12/1985 Hashimoto ................... 179/6.05

FOREIGN PATENT DOCUMENTS 2510906 9/1975 Fed. Rep. of Germany .
2633882 2/1978 Fed. Rep. of Germany .
3234064 3/1983 Fed. Rep. of Germany .

Primary Examiner—Raymond F. Cardillo
Assistant Examiner—James E. Tomassini
Attorney, Agent, or Firm—Frishauf, Holtz, Goodman & Woodward

[57] ABSTRACT

An automatic telephone answering apparatus includes tape recorder sections for outputting a speech message through a telephone line, and for recording and reproducing a speech signal through the telephone line, a controller for setting the tape recorder sections in predetermined modes, and a decoder for decoding a remote control signal received through the telephone line and supplying a decoded remote control signal to the controller. A muting circuit between a telephone line interface and the tape recorder sections blocks remote control signals from being recorded, in response to a timing signal generated by a DTMF receiver in the decoder.

21 Claims, 39 Drawing Figures

FIG. 3A

```
1. ANNOUNCE REC
        │
        ▼
SIMULTANEOUSLY
DEPRESS A.ANS AND
REC KEYS OR A.ONL
AND REC KEYS
        │
        ▼
SET A.ANS REC
OR A.ONL REC
MODE (CPU)
        │
        ▼
PERFORM MECHANISM
SELECTION (OGM DECK),      DURING THESE
HEAD SELECTION       ────▶ OPERATIONS,
(A.ANS OR A.ONL),          KEEP DEPRESSING
TAPE SPEED SETTING,        REC KEY
DISPLAY OUTPUT AND
AMP CONTROL
        │
        ▼
START REC
        │
        ▼
RELEASE REC KEY
        │
        ▼
RECORD BEEP TONE
(1 KHZ) FOR
ONE SECOND
        │
        ▼
REW
        │
        ▼
TAPE END DETECTION ──────▶ SAME AS IN
        │                   ANNOUNCE CHECK
        ▼
STOP
```

FIG. 23
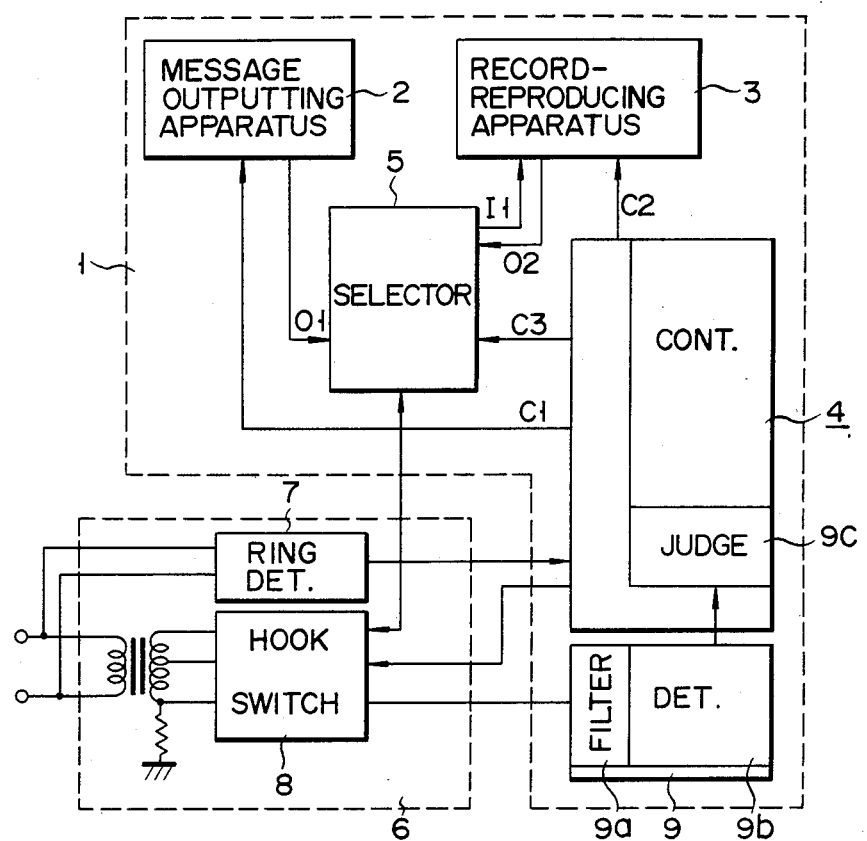
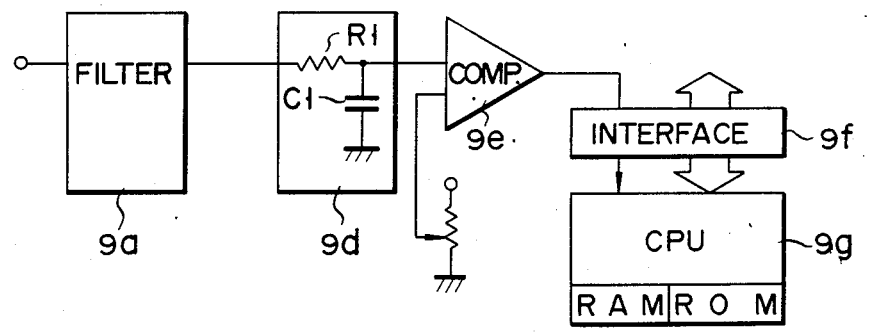
FIG. 24

AUTOMATIC TELEPHONE ANSWERING APPARATUS WITH REMOTE CONTROL SIGNAL MUTING

BACKGROUND OF THE INVENTION

This invention relates to an automatic telephone answering apparatus.

In a conventional automatic telephone answering apparatus, a predetermined outgoing message is sent out upon reception of an incoming call to invite a caller to leave a note (i.e., a message), and the caller's message is recorded on an incoming message tape.

However, conventional automatic telephone answering apparatus do not provide multiple functions and a simple construction. Demand has arisen for a simple multifunction automatic telephone answering apparatus, which responds to every need of the user.

In a conventional automatic telephone answering apparatus, a subscriber can call his telephone number in the same manner as a third calling party to access a group of messages recorded on an incoming message tape by means of a remote control unit coupled to a telephone set or directly to a telephone line.

In order to perform such remote control, a specific remote control code is sent to the apparatus to cause the apparatus to respond to the specific code.

For this purpose, in the conventional system a security code is used as the remote control signal. According to this system, the security code as the remote control signal is generated in response to a DTMF (dual tone multifrequency) signal in a pushbutton telephone. In principle, a simple remote control unit having the same function as described above can be used as one remote control system of the present invention.

In such a simple remote control unit, a 2-bit code is adopted when the number of different functions to be operated in response to the control code is small. (This unit is basic and is used only by an ordinary subscriber, and does not, therefore, require a security code).

In this type of remote control unit, the automatic telephone answering apparatus receives the remote control signal during an OGM (outgoing message/specific message for a caller) transmission, as well as the DTMF signal. The remote control signal is sent through the telephone line and is in the voice frequency band. When the OGM has a frequency component very similar to that of the remote control signal, an operation failure occurs.

The remote control unit of the automatic telephone answering apparatus must guarantee security (secrecy) for a third party. At the same time, when a DTMF signal is used as a security code and a remote control signal, and when a simple system having the same function as that of the above remote control unit is used, failure must be eliminated and remote control must be made reliable.

SUMMARY OF THE INVENTION

It is, therefore, an object of the present invention to provide a new and improved automatic telephone answering apparatus in which multiple functions can be obtained with a simple arrangement, and the reliability of remote control operation can be improved.

According to the present invention, an automatic telephone answering apparatus comprises: first means for sending a speech message through a telephone line, second means for recording and reproducing a speech signal through said telephone line, third means for controlling and setting the first and second means in a predetermined mode, and fourth means for decoding a remote control signal received through said telephone line and supplying a decoded remote control signal to the third means.

Other than the basic uses of the answering apparatus of this invention, such as the AUTO ANSWER and ANNOUNCE modes and the control of modes containing the security code, other uses of the apparatus are common office functions, such as dictating and telephone (two-way recording). The messages recorded by these functions can be dealt with as one kind of ICM (incoming message) and output using the remote control for the benefit of the user.

Along with providing multiple functions, the microprocessor used in this apparatus alternately switches the OGM reproducing section and ICM recording section to the telephone circuit. Also, if these switching operations originate in the main apparatus, this can be indicated by a lamp display or by sound. When, however, a caller accesses the apparatus from a remote location, he is certain only that his voice is heard, but not whether the other functions have been performed by the apparatus. Therefore, a beeping sound (attention getting sound) can be programmed to indicate to the caller the mode that is in use and the meaning of the particular mode.

BRIEF DESCRIPTION OF THE DRAWINGS

These and other objects and features of the present invention can be understood by reference to the accompanying drawings, in which:

FIGS. 3A to 3H are respectively flow charts for explaining the functions of the respective parts of the electrical circuit system shown in FIG. 2;

FIG. 23 is a diagram showing the main part of an automatic telephone answering apparatus according to still another embodiment of the present invention;

FIG. 24 is a diagram showing the arrangement of a decoder used in the apparatus of FIG. 23.

DETAILED DESCRIPTION OF THE PREFERRED EMBODIMENTS

Figure 1A:
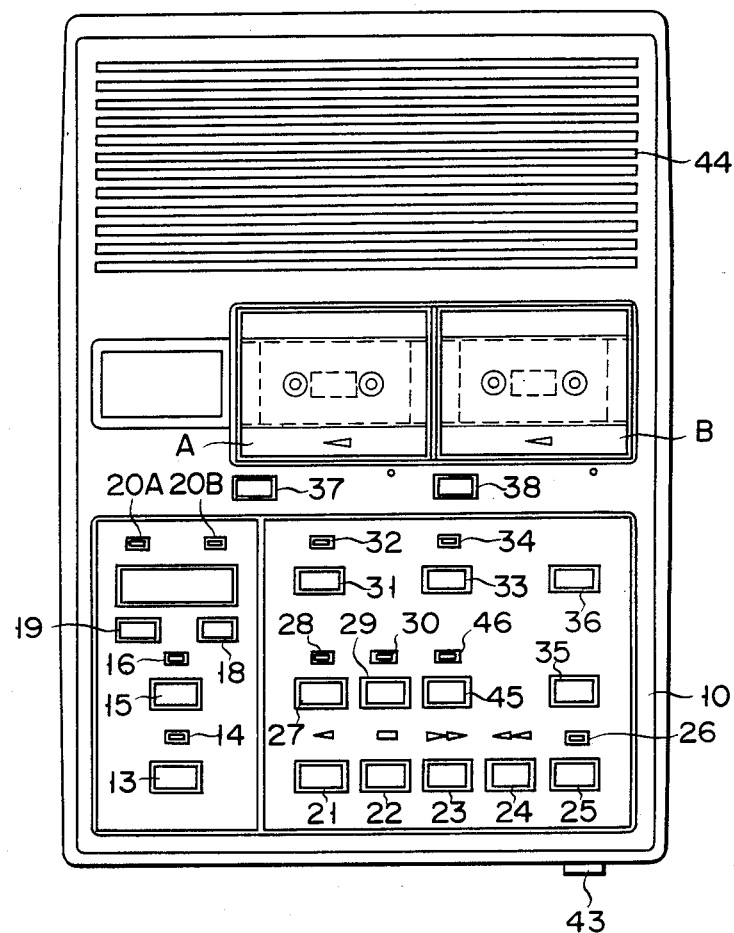
FIGS. 1A to 1D are respectively a plan view, a front view, a rear view and a side view of an automatic telephone answering apparatus according to an embodiment of the present invention.
Figure 1B:
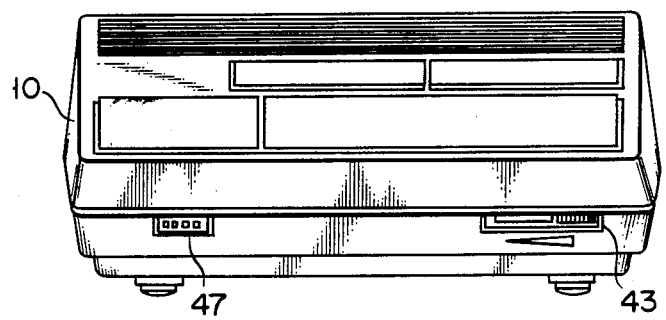
Figure 1C:
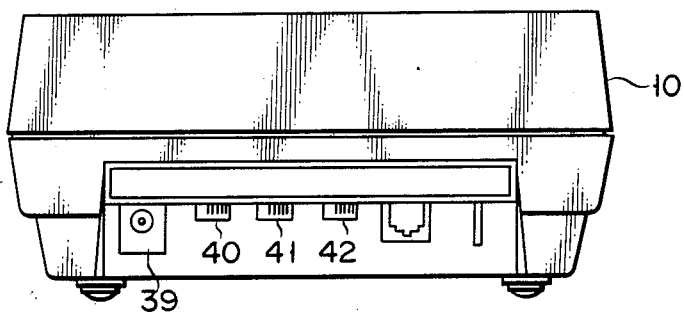
Figure 1D:
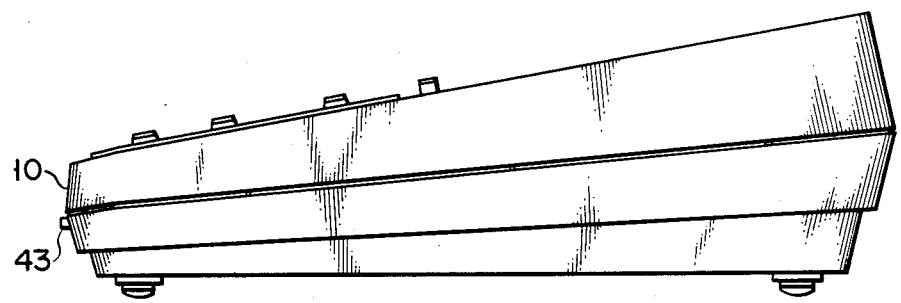

Preferred embodiments of the present invention will be described with reference to the accompanying drawings.

FIGS. 1A to 1D show the outer appearance of an automatic telephone answering apparatus according to an embodiment of the present invention.

An OGM (outgoing message) tape deck A and an ICM (incoming message) tape deck B are arranged next to each other substantially at the center of an upper surface of a cabinet 10. The decks A and B use, for example, microcassette tapes.

A POWER key 13 and its indicator 14, message counter operation key 15 and its indicator 16, hour (H) digit key 17 and a minute (M) key 18, counter display 19, IN USE indicator 20A, and TAPE END indicator 20B are arranged at the lower left portion of the upper surface of the cabinet 10.

A PLAY key 21, STOP key 22, REW (rewind) key 23, FF (fast forward) key 24, ERASE key 25, ERASE indicator 26, RECORD key 27, RECORD indicator 28, PHONE key 29, PHONE indicator 30, MEMO key 45, MEMO indicator 46, AUTO ANSWER key 31, AUTO ANSWER indicator 32, ANNOUNCE ONLY key 33, ANNOUNCE ONLY indicator 34, CHECK RECORD key 35, and SLOW key 36 are arranged at the lower right portion of the upper surface of the cabinet 10.

It should be noted that reference numerals 37 and 38 respectively denote OGM and ICM tape EJECT keys.

A DC jack 39, RING switch 40, CODE switch 41, MESSAGE switch 42 and so on are arranged on the back surface of the cabinet 10.

A volume control 43 and a built-in microphone 47 are arranged on the front surface of the cabinet 10. A speaker slit portion 44 is formed at the upper part of the upper surface of the cabinet 10.

Figure 2:
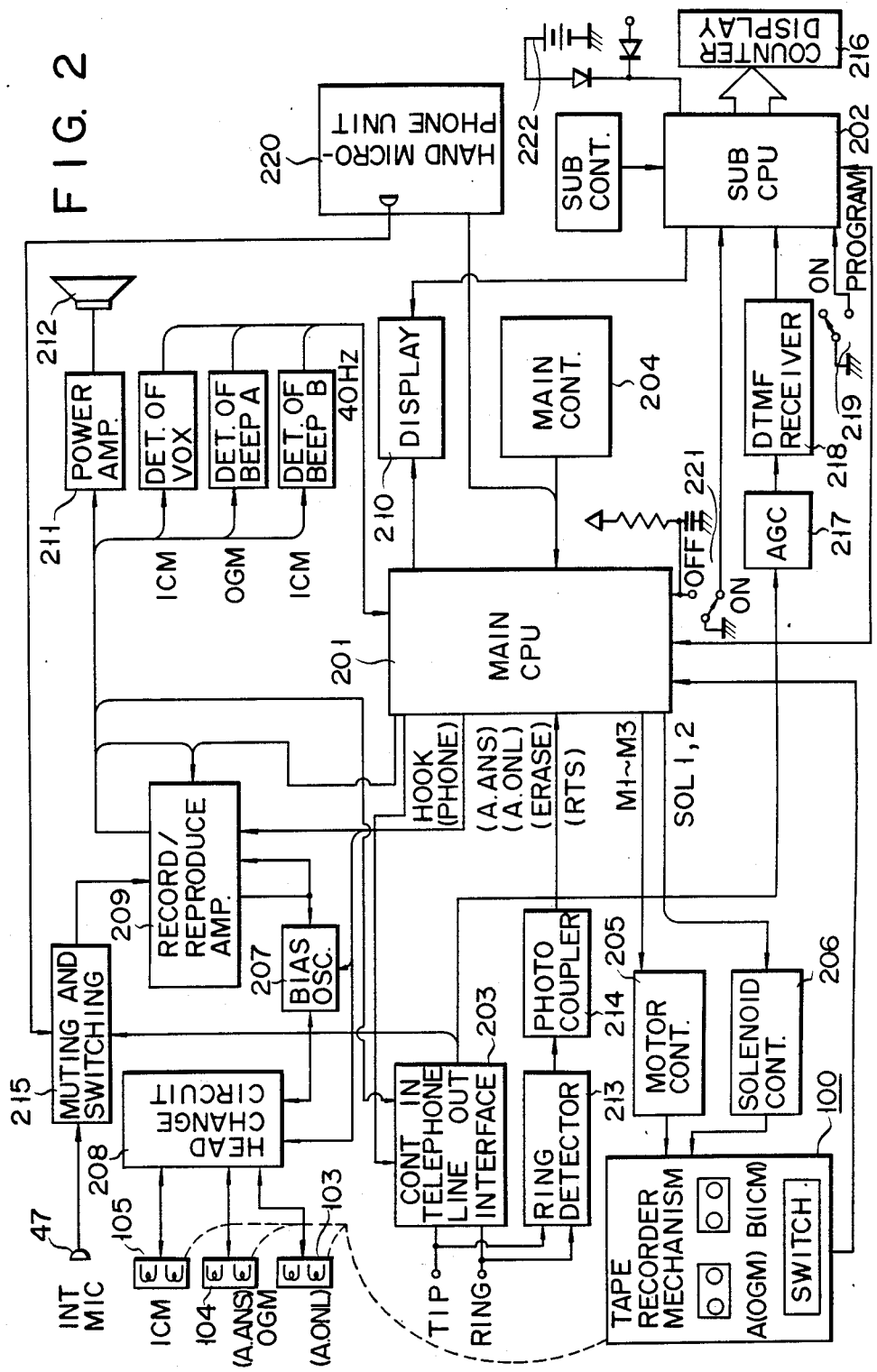
FIG. 2 is a block diagram of an electrical circuit system of the apparatus shown in FIG. 1.

FIG. 2 shows an electrical circuit of an automatic telephone answering apparatus according to the present invention.

The basic arrangement and functions of the circuit shown in FIG. 2 will first be described. In principle, the OGM and ICM tape decks A and B arranged in a tape recorder mechanism 100 are driven by one motor under the control of a main CPU 201 and a sub CPU 202 in a manner to be described later. A prerecorded outgoing message (to be described later) is automatically sent to a caller (i.e., a calling party) through a telephone line interface 203, and an incoming message from the caller is automatically recorded in the tape deck B. In practice, the following functions are provided:

(1) ANNOUNCE RECORD

A message, i.e., an OGM (outgoing message) to be sent to the caller while the called party is out is recorded in the OGM tape deck A. After recording, the apparatus is set in a standby state for ANNOUNCE ONLY (A.ONL) or AUTO ANSWER (A.ANS) mode.

Figure 4A:
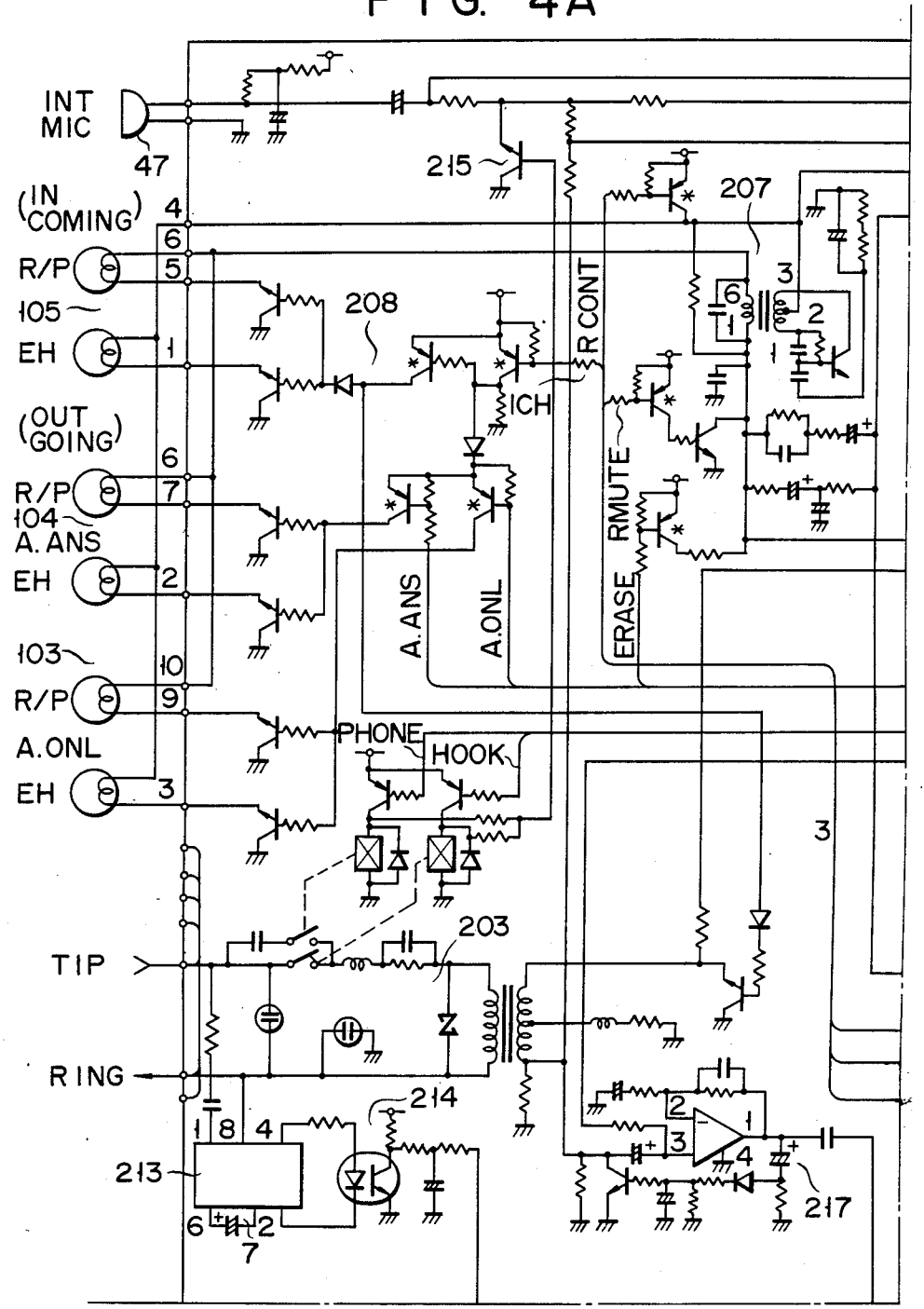
FIGS. 4A to 4E are circuit diagrams of the system shown in FIG. 2.
Figure 4B:
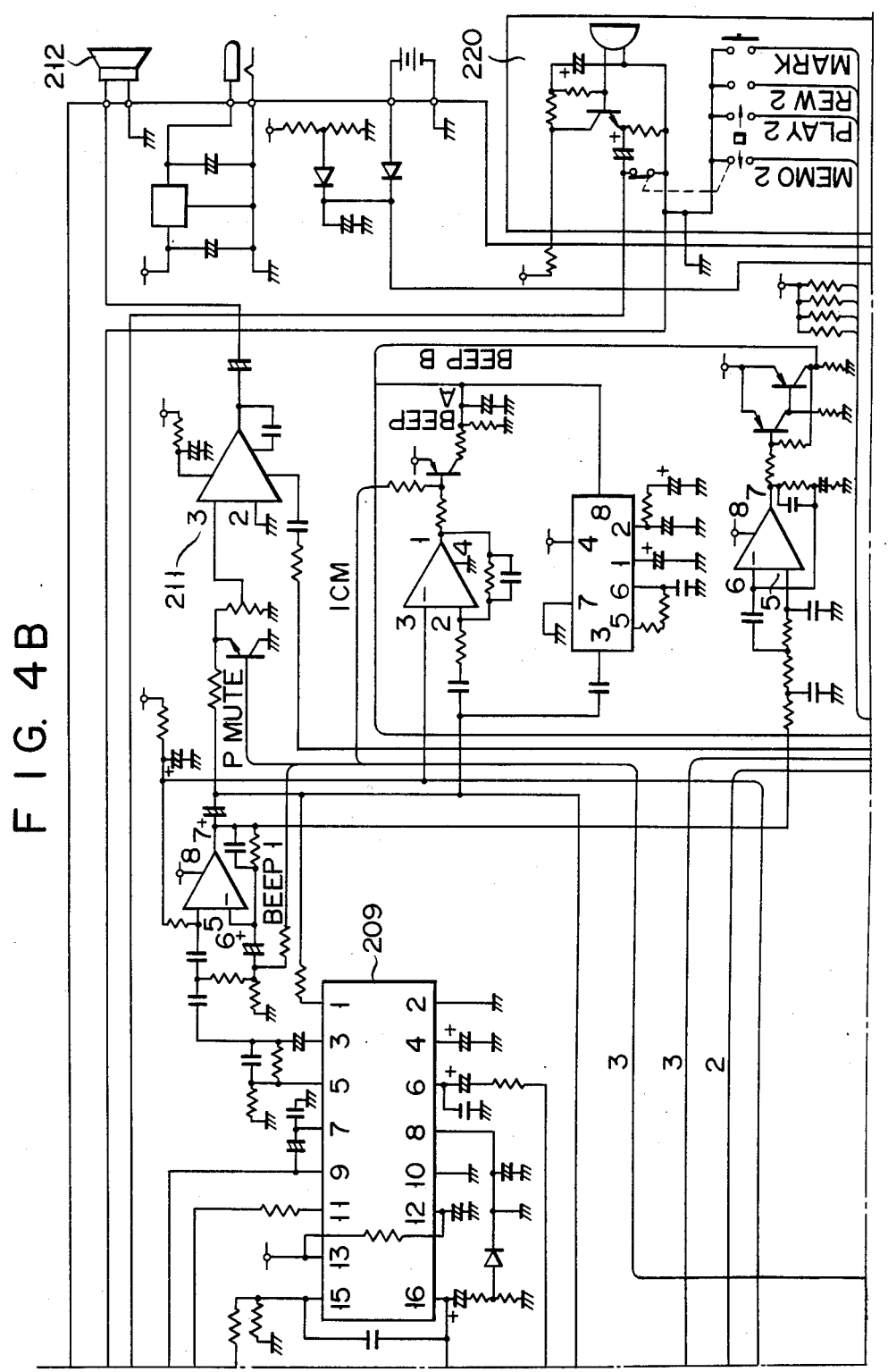
Figure 4C:
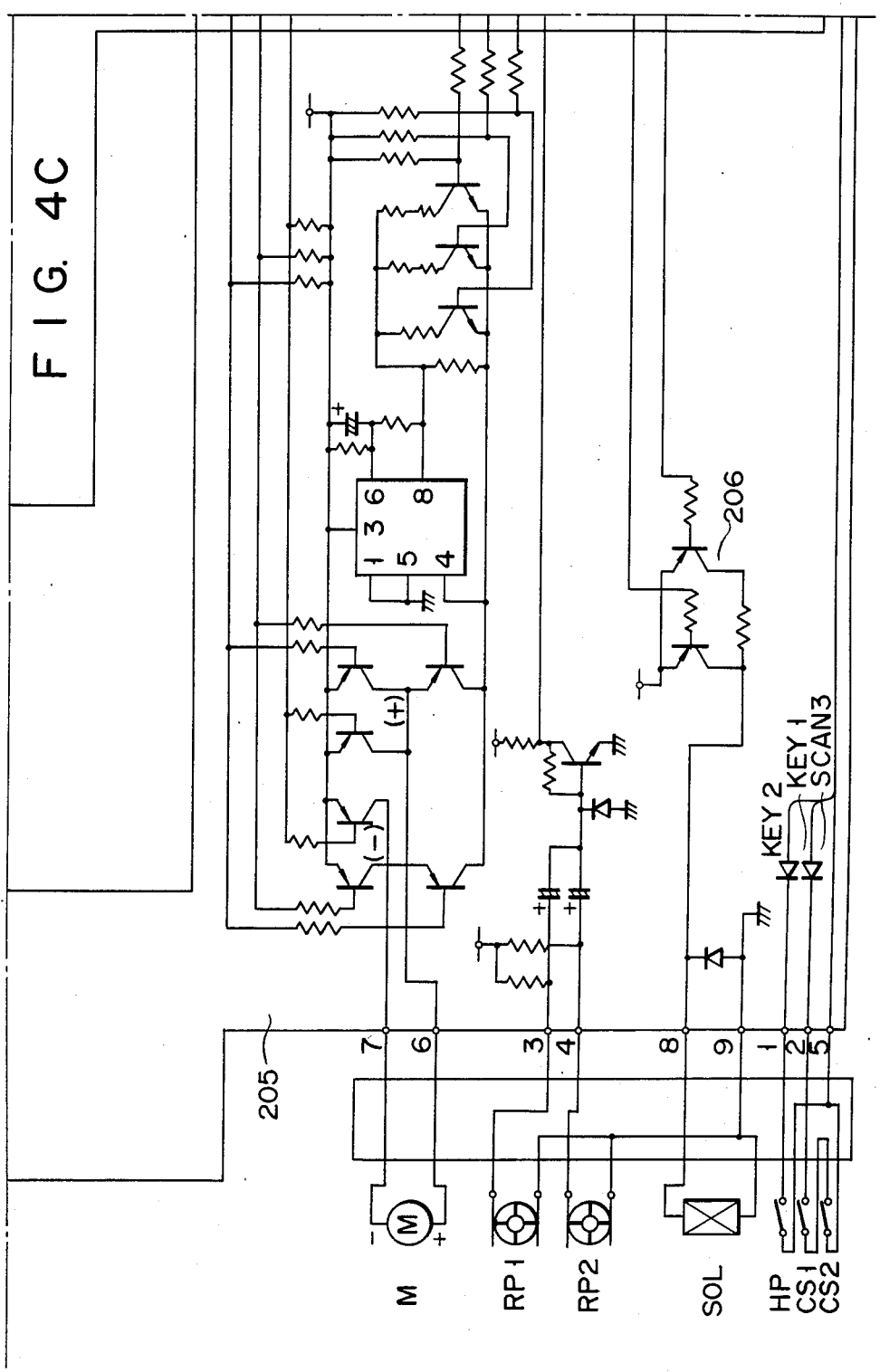

A predetermined key is selected and operated among the above-described keys arranged in a main controller 204. The main controller 204 controls a motor M and a solenoid SOL (see FIG. 4C) through the main CPU 201, a motor controller 205 and a solenoid controller 206. A tape in the tape deck A in the tape recorder mechanism 100 is driven in a predetermined travel direction at a predetermined speed. At the same time, an OGM A.ONL or A.ANS head 103 or 104 is set in the RECORD mode through a bias oscillator 207 and a head changing circuit 208. The OGM, which is input at the same built-in microphone as the microphone 47 of FIG. 1 and which passes through a mute and switch circuit 215 and a record/reproduce amplifier 209, is recorded in a corresponding track of the tape in the tape deck A.

The A.ONL function indicates a response for sending an OGM representing that the called party is out. The A.ANS function indicates a response for sending an OGM which represents the absence of the called party and an invitation to the caller to record a message, i.e., an ICM (incoming message). The A.ONL or A.ANS function can be selected by corresponding keys among the keys arranged in the main controller 204.

An OGM is recorded after the POWER key 13 is operated and the POWER indicator 14 is turned on (this operation is the same for every other function to be described later, and a description thereof is omitted). As shown in the flow chart of FIG. 3A, an AUTO ANSWER key 31 or an ANNOUNCE ONLY key 33 is operated together with the RECORD key 27. Only the RECORD key 27 is kept depressed while the OGM is being recorded.

During this operation, the indicators 32 and 28 or the indicators 34 and 28 arranged in a display 210 are kept on.

When the user finishes recording the OGM and releases the RECORD key 27, a beep tone from the main CPU 201 is recorded in the tape for one second as a message end tone. Thereafter, the indicator 28 is turned off, and the OGM tape deck A is automatically rewound.

During rewinding, when an auto shut-off unit using reel pulse generators RP1 and RP2 (FIG. 4C) in the tape recorder mechanism 100 detects a tape end, the tape recorder mechanism 100 is automatically stopped. In this case, the response operation must be performed depending on the A.ONL or A.ANS function. For this reason, the positions of the heads 104 and 105 of the OGM tape deck A are located slightly behind the normal stop positions. In other words, the OGM tape deck A is set in the standby state. The A.ONL or A.ANS operation is started when the OGM tape deck A is set in the standby state, thereby decreasing the drive current from the solenoid controller 206 and at the same time providing a high-speed response (this operation is the same for every other function to be described later, and a description thereof will be omitted).

(2) ANNOUNCE CHECK

This function is provided to check the content of the OGM recorded in the OGM tape deck A with the ANNOUNCE RECORD function (1). With the ANNOUNCE CHECK function, the OGM tape deck A is set in the reproduce or play mode. Thereafter, the OGM tape deck A is set in the standby mode for A.ONL or A.ANS operation.

Figure 3B:
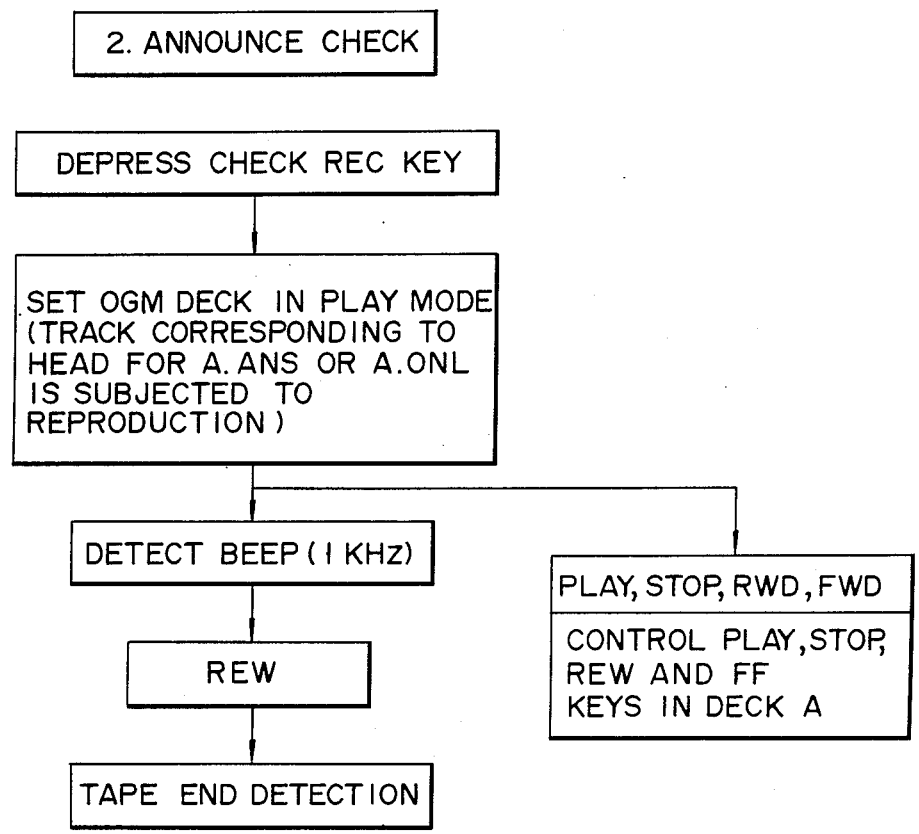

In this case, when the user operates the CHECK RECORD key 35 arranged in the main controller 204, as shown in a flow chart of FIG. 3B, one of the indicators 32 and 34 which corresponds to a selected one of the A.ONL and A.ANS operations is turned on through the main CPU 201. At the same time, the OGM tape deck A in the tape recorder mechanism 101 and the A.ONL or A.ANS head 103 or 104 are set in the drive or play state in the same manner as in function (1). The reproduced content is supplied to a power amplifier 211 through the head changing circuit 208 and the record-/reproduce amplifier 209 and is audibly reproduced at a loudspeaker 212.

When the ANNOUNCE CHECK operation is completed, the beep tone at the message end is detected, and the OGM tape deck A is automatically rewound.

(3) ANNOUNCE (A.ONL) Response

When the tape deck A is set in the standby state for A.ONL as described above, the ANNOUNCE (A.ONL) response function serves to automatically announce the A.ONL OGM recorded in the predetermined track of the tape in the OGM tape deck A with the function (1). In the same manner as in function (2), after the A.ONL OGM is sent to the caller, the OGM tape deck A is automatically set in the REW mode and prepares for the next incoming call.

Figure 3C:
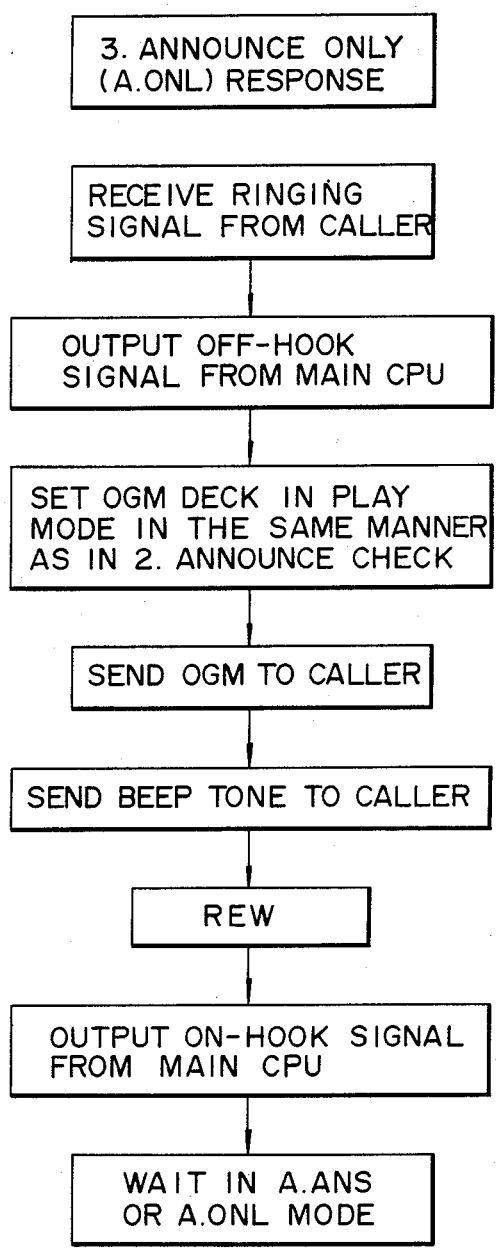

As shown in the flow chart of FIG. 3C, when a ringing signal from a caller is received through a telephone line TIP at ring terminal RING, the ringing signal is detected by a ring detector 213. A detection signal from the ring detector 213 is supplied to the main CPU 201 through a photocoupler 214. The main CPU 201 supplies a control signal to the telephone line interface 203 causing the telephone line interface 203 to engage with the telephone line. In other words, an off-hook state is established. The main CPU 201 sets the OGM tape deck A in the play mode in the same manner as in function (2). The reproduced content is supplied to the telephone line interface 203 through the record/reproduce amplifier 209, thereby sending the OGM to the caller.

After the OGM is sent, the beep tone is sent onto the telephone line through the main CPU 201 so as to set the OGM tape deck A in the REW mode. The interface then disengages from the telephone line. In other words, the on-hook state is established.

In this case, after the A.ONL OGM is sent, the OGM tape deck A is set in the standby mode for A.ONL. However, the OGM tape deck A may be set in the standby mode for A.ANS as will be described later. In this case, the A.ONL OGM is sent once (or a plurality of times) upon operation of the corresponding key, and thereafter the A.ANS OGM is sent. In this manner, the A.ANS OGM may have a priority function over the A.ONL OGM.

(4) AUTO ANSWER (A.ANS) Response

With the AUTO ANSWER function, when the OGM tape deck A is set in the standby mode for A.ANS as described above, the A.ANS OGM is automatically sent to the caller, and an ICM as a caller's message is automatically recorded. After the ICM is recorded, the OGM tape deck A is automatically set in the REW mode in the same manner as in function (2). At the same time, the ICM tape deck B is stopped at the current position, and the OGM tape deck A is set in the standby mode for the next A.ANS.

Figure 3D:
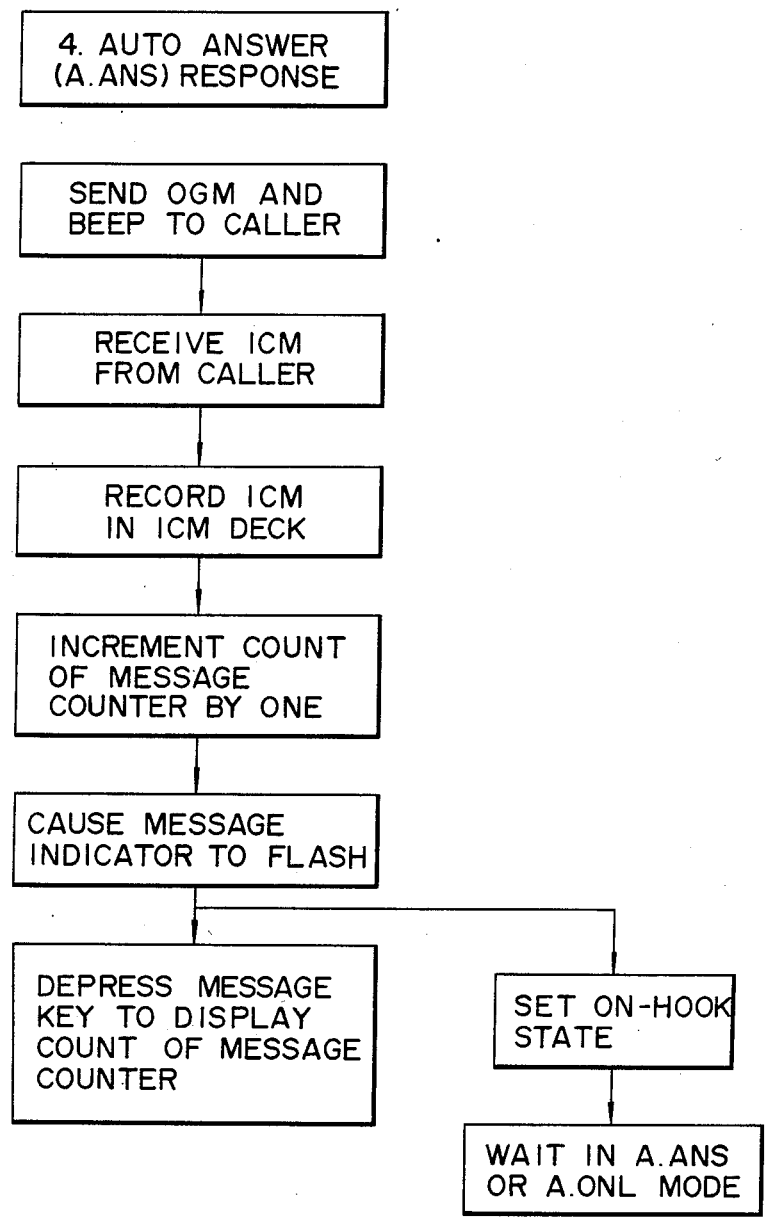

In this case, the operation is the same as that of function (3) until the OGM tape deck A sends the OGM to the caller. However, as shown in a flow chart of FIG. 3D, the ICM from the caller and the telephone line interface 203 is supplied to the ICM head 105 through the mute and switch circuit 215, the record/reproduce amplifier 209, the bias oscillator 207 and the head changing circuit 208. The ICM head 105 records the ICM. It should be noted that the ICM tape deck B in the tape recorder mechanism 100 is driven in the same manner as in the case of the OGM tape deck A.

When the AUTO ANSWER operation is completed and the ICM from the caller is recorded in the tape in the ICM tape deck B for a predetermined period of time, a counter display 216 (which is the same as the counter display 19) is incremented by one through the sub CPU 202. At the same time, the MESSAGE indicator 16 in the display 210 flashes in response to the control signal supplied through the main CPU 201.

The counter display 216 performs timepiece display under the control of the sub CPU 202. The counter display 216 displays the message count only when the MESSAGE key 15 is operated.

(5) PHONE (2-WAY) Recording

With this function, which differs from the automatic telephone answering function, while the called party at a telephone set connected to a modular jack (FIG. 3E) of the automatic telephone answering apparatus communicates with the caller, voices of the speakers are recorded in the ICM tape deck B upon operation of the PHONE key 29 arranged in the main controller 204.

Figure 3E:
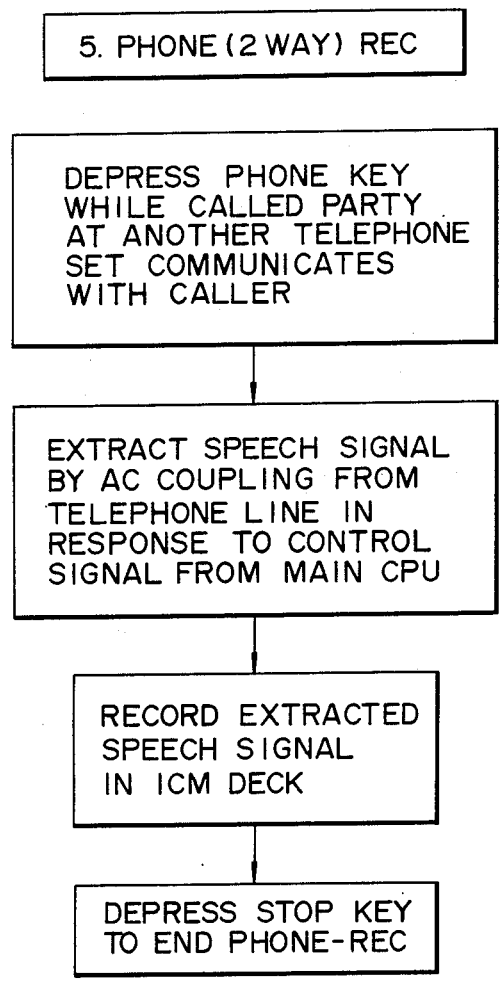

As shown in a flow chart of FIG. 3E, the indicator 30 arranged in the display 210 is turned on upon operation of the PHONE key 29. At the same time, the main CPU 201 supplies a control signal to the telephone line interface 203 to extract the speech signal in the on-hook state, i.e., so-called AC coupling. In the same manner as in ICM recording of function (4), the ICM tape deck B is driven. The speech signal extracted by AC coupling from the telephone line interface 203 is supplied to the ICM head 105 in the same manner as in the ICM recording of function (4). The ICM tape deck B is thus set in the RECORD mode.

The above operation is stopped upon operation of the STOP key 22 arranged in the main controller 204. The indicator 30 is immediately turned off.

(6) MEMO RECORD

Figure 3F:
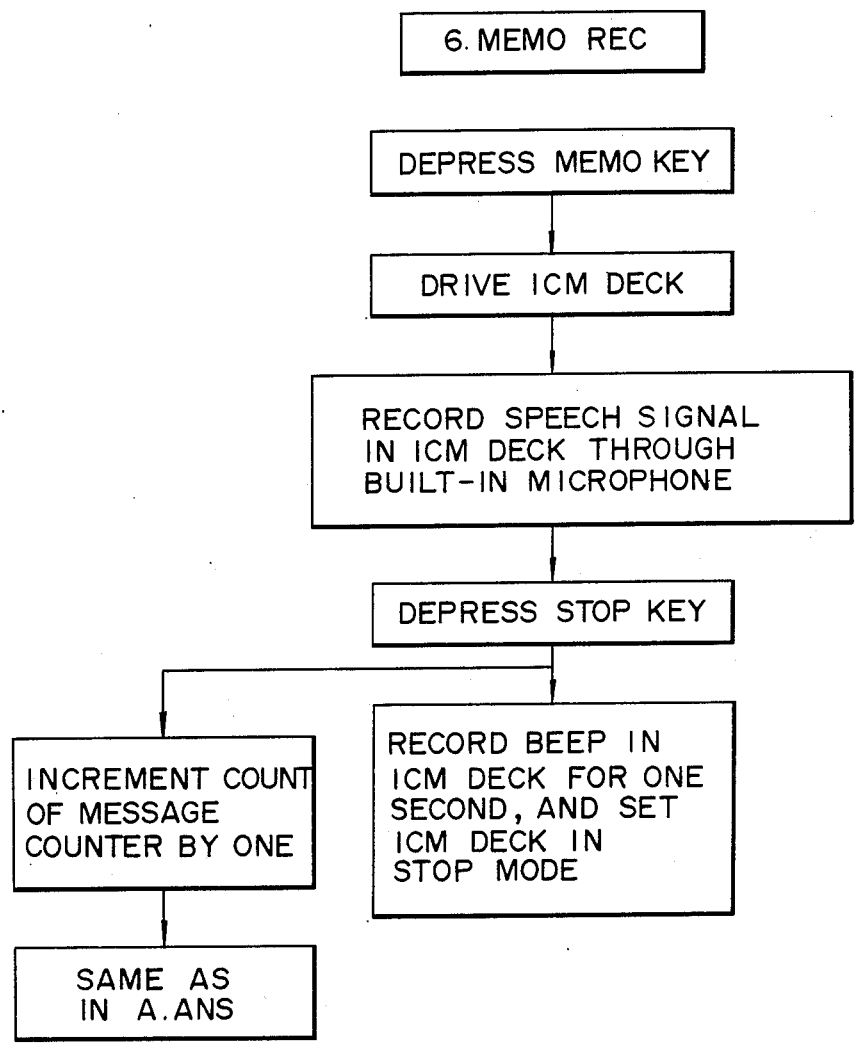

This function provides the same operation as a dictating machine. As shown in a flow chart of FIG. 3F, when the MEMO key 45 in the main controller 204 is operated, the corresponding indicator 46 in the display 210 is turned on under the control of the main CPU 201. At the same time, the ICM tape deck B is driven, and voice input to the built-in microphone 207 is supplied to the ICM head 105. The voice input is recorded in the ICM tape deck B.

The MEMO RECORD operation is stopped upon operation of the STOP key 22 in the same manner as in the operation of function (5). As previously described, after the beep tone is recorded for one second, the tape is then driven without recording for, for example, two seconds. The ICM tape deck B is stopped, and finally the indicator 30 is turned off.

In the same manner as in the operation of function (4), the content of the MESSAGE counter display 216 is incremented by one, and the indicator 16 flashes.

(7) Remote Control by Security Code

According to this function, a specific code, i.e., a security code which is known only by the subscriber is sent to the apparatus through a remote telephone set, and the automatic telephone answering apparatus is then remotely controlled.

Figure 3G:
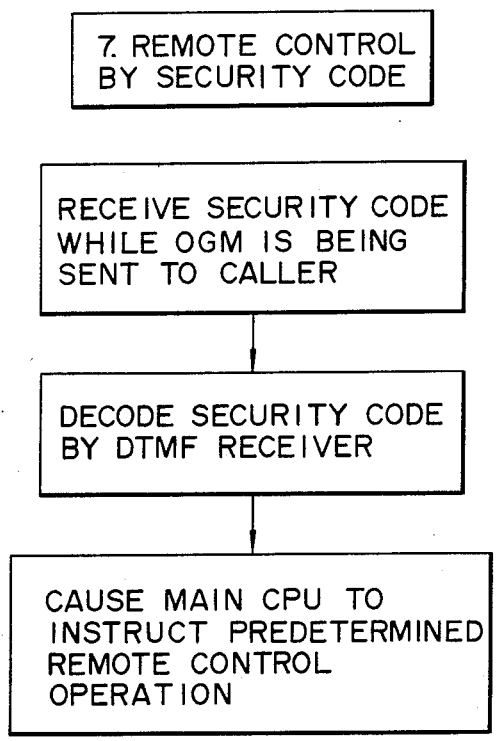

More particularly, as shown in a flow chart of FIG. 3G, when the security code is received by the apparatus while the apparatus sends the OGM to the caller (in this case, the subscriber), the apparatus is set in the remote control signal receive state. The following remote control operations can be performed by pushbuttons "1" to "9", excluding "0", in accordance with the DTMF system:

"1" . . . REW, "2" . . . PLAY, "3" . . . SKIP, "4" . . . STOP,

"5" . . . BACKSPACE (to be described later),

"6" . . . RECORD, "7" . . . A.ANS, and "9" . . . A.ONL (The pushbutton marked with * is used for resetting the security code in a manner to be described later.)

The RECORD signal in the remote control mode serves to perform ICM recording in the A.ANS mode and holding in the remote mode.

In practice, when the security code is transmitted while the OGM tape deck A is being operated, the security code is received by a DTMF receiver 218 through the telephone line interface 203 and an AGC circuit 217. The predetermined remote control instruction signals from the DTMF receiver 218 are supplied to the sub CPU 202.

Generation of the security code and remote control operation will be described later.

(8) Message Counter/Security Code/Timepiece Control

These functions are performed by the counter displays 19 and 216. The message counter function is performed so that the count of the counter is incremented by one every time an ICM is recorded for 12 seconds or longer. A maximum of 99 messages can be registered with the counters.

The counter displays 19 and 216 also provide a timepiece function for displaying the current time. As previously described, the counters serve as message counters to display the number of ICMs only when the MESSAGE key 15 is operated. A display figure "□" indicates blanking at the counter display 19.

In the timepiece function mode, the keys H and M are used to increase hour data and minute data, respectively, (however, a carry from the minute digit to the hour digit is not performed in this case). The timepiece function accompanies display of an AM or PM mark.

Figure 3H:
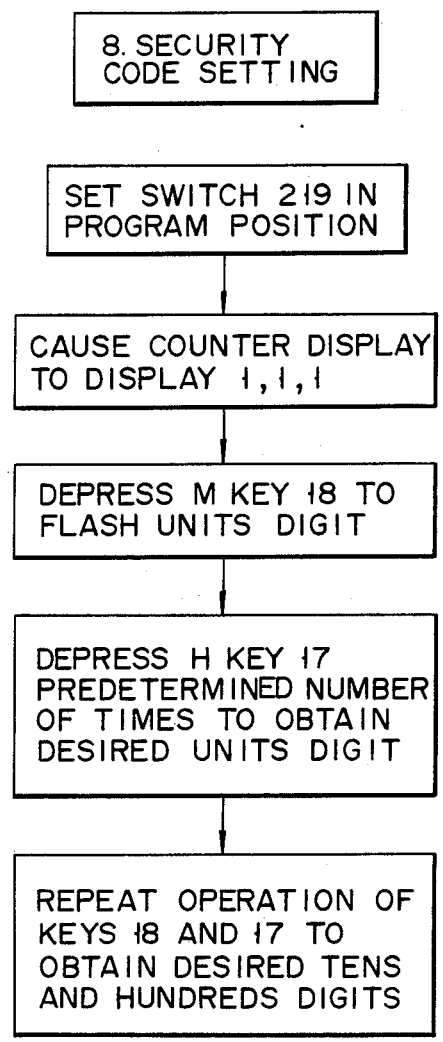

The security code is set (written) after a switch 219 is set from a timepiece display ON position to a PROGRAM position, as shown in a flow chart of FIG. 3H. The counter display 19 starts with a 3-digit display as "111". The unit's digit flashes upon operation of the M key 18. In this state, when the H key 17 is depressed the number of times corresponding to the code to be set, the unit's digit is counted up the corresponding number of times. When the unit's digit becomes the desired numeric value, the M key 18 is depressed to write the desired value in the sub CPU 202, and at the same time, a ten's digit flashes. By repeating the same operation as described above, the ten's digit and finally a hundred's digit are written in the sub CPU 202.

In this state, the security code is set in the sub CPU 202. Thereafter, the switch 219 is set in the ON position to cause the counter displays 19 and 216 to provide a timepiece function.

The functions accompanying functions (1) to (8) will be described in detail below:

(9) EXTRA DELAY WHEN TAPE IS FULL (a) When the ICM tape has reached its end during ICM recording, a beep tone is sent onto the telephone line, and the OGM deck is set in the REW mode. Thereafter, the on-hook state is established.

By switching to the A.ONL mode after switching to the off-hook state, it is possible to prevent the recording of an ICM of the next caller.

(b) After state (a), the apparatus will not respond to an incoming call until the ringing tone is repeated over 15 times unless other operations are performed.

(c) When the ringing tone is repeated 15 times, the OGM deck is normally operated and then the ICM deck is started. However, since the ICM tape has reached its end, the beep tone is sent, and the on-hook state is established. When the remote control mode is set during OGM operation, remote control is performed.

(d) When operation (REW or the like) at the apparatus or remote control operation is performed, the above delay is cancelled.

The modes can be freely switched back and forth between the A.ONL and A.ANS modes either by operating the main apparatus or the remote control unit.

(10) TAPE SPEED Selection (a) As this apparatus is a multiple function answering apparatus, the apparatus may be left in the message recording and telephone recording or the remote control mode, and the apparatus will be in a STOP state. In such a case when the ICM deck is set in the PLAY mode and the SLOW key 36 is operated, the tape speed is decreased to 1.2 cm/sec. However, when the SLOW key 36 is depressed again, the tape speed is increased to 2.4 cm/sec.

(b) When a key such as the STOP key is depressed during 1.2-cm/sec PLAY mode, the next PLAY operation is performed at the tape speed of 2.4 cm/sec.

(11) AUTOMATIC REVERT TO ANSWER (a) When a predetermined period of time has elapsed without performing any operation, the apparatus is automatically set in the AUTO ANSWER mode. However, when the ANNOUNCE ONLY mode is selected, the ANNOUNCE ONLY mode can be set. In this case, the corresponding indicator must be turned on.

(b) In the POWER OFF state, the state (a) cannot be obtained unless the POWER key is turned on. The time interval required for setting the apparatus in the AUTO ANSWER mode is about 12 seconds. This time interval may vary in accordance with the last operation mode of the apparatus and is not confined to a specific value.

(12) MESSAGE Counter (a) Even when one message is received, the MESSAGE indicator 16 flashes. When the ICM deck B is set in the REW or ERASE mode, the indicator 16 is turned off.

(13) TAPE END Alarm (a) When the tape in the ICM tape deck has reached its end in the FF, REW or PLAY mode, the tape is stopped, and the corresponding indicator 21 is turned on. A beep tone is generated at the loudspeaker 212 for a period of t2.

(b) The indicator 21 is kept on until the next operation is performed.

(14) IN USE Indicator (a) When the apparatus is operated in response to an incoming call (the off-hook state), the IN USE indicator 20 is turned on.

(15) ICM Length Limit Selection (a) An ICM length can be limited by a 30"/VOX selection switch 42.

(b) For 30", a beep tone is generated when a period of 30" has elapsed after the ICM deck B is started, and the OGM tape is rewound. Thereafter, the on-hook state is established.

(c) For VOX, when the voice of the caller is not generated for a period of t16, a period of t9 beep tone is recorded, and the on-hook state is established. When a voiceless portion of 6 seconds is present within 30", the beep tone is recorded, and the on-hook state is established. When a maximum recording time (i.e., 5 minutes) has elapsed, the beep tone is recorded, and the OGM tape is rewound. Finally, the on-hook state is established.

(16) RING Selector (a) The number of ringing tones from the caller can be selected between one and four by a RING SELECTOR switch 41.

(b) In this case, four ringing tones are effective only for the first incoming call.

(c) Only one ringing tone is required when the second and subsequent calls are made or MEMO recording has been performed.

(17) Loudspeaker Monitor (a) When the ICM deck is started, the caller's voice is produced at the loudspeaker 212.

(b) The loudspeaker volume can be controlled by the volume control 43.

(18) Simple Remote Control by Remote Control Transmitter (a) The remote control transmitter is used to control the apparatus from the caller side by using a digital code.

(b) The user sets a 4-bit ID code (an 8-bit code in a description to be made later) by using the above-mentioned transmitter and a switch (not shown) built into the apparatus.

(c) A 3-bit code is used to perform the following operation. Three keys are used to set the REW, PLAY and SKIP modes. However, in a description to be made later, four keys (4-bit code) are used to set the REW, PLAY, SKIP and STOP modes.

(19) Response Step to Caller in AUTO ANSWER Mode (a) When the RING SELECTOR is turned on after the presence/absence of a MESSAGE input is discriminated, the IN USE indicator is turned on.

(b) The OGM on the AUTO ANSWER track is sent, and the OGM deck is stopped when the OGM tape has reached its end.

(c) The beep tone is sent through the telephone line until the ICM deck is set in the RECORD mode. When a period of t18 has elapsed after the ICM deck is started and the first message is received, the MESSAGE indicator flashes and the MESSAGE counter is incremented by one.

(d) The 30"/VOX function is selected and a period of t16 voiceless portion is detected. In either case, the beep tone is sent (1 kHz) for one second and recorded (40 Hz) for one second. The tape in the ICM deck is driven without recording for two seconds and is then stopped. When a period of t15 has elapsed even in the VOX mode, the beep tone (40 Hz) is forcibly recorded on the ICM tape for a period of t9 and the tape is driven without recording for a period of t1. Thereafter, the ICM tape is stopped.

(e) The OGM tape is rewound, and the on-hook state is established. In this case, the IN USE indicator is turned off, and the apparatus waits for the next incoming call.

(f) The ICM deck is stopped without recording the beep tone (40 Hz) when the message is received within a period of t18 after the ICM deck is started.

(20) Response Step to Caller in ANNOUNCE ONLY Mode (a) Same as the operation (a) of (19)

(b) The OGM on the ANNOUNCE ONLY track is sent, and the beep tone is generated at the message end. The OGM deck is then stopped.

(c) Same as the operation (c) of (19)

(21) REMOTE CONTROL Operation (by the DTMF)

(a) When the remote control signal is transmitted from the handset while the OGM deck is being operated, the apparatus is operated in the designated mode. However, when a 3-digit security code is received, the remote control mode can be set.

(b) The apparatus is operated in accordance with the respective remote operation modes.

(c) When the tape is rewound and has reached its start point in the remote control mode, the beep tone is generated and the tape is stopped. When no further operation is made in the STOP mode for a period of t2, the OGM deck is rewound, and the on-hook state is established. A selected one of the AUTO ANSWER and ANNOUNCE ONLY modes is set.

(d) When the remote control is stopped without STOP operation at PLAY or SKIP operation in the remote control mode, and the on-hook operation is performed at the caller side, as a fail-safe function, the ICM deck is operated until the tape reaches its end, and the tape is stopped. Then the tape is subjected to backspacing by one incoming call and is stopped again, and after a period of t2, the OGM deck is rewound, and the on-hook operation is performed.

(22) High-Speed Erase (a) When the ERASE key 25 is operated, the corresponding indicator 26 is turned on. Subsequently, the user simultaneously depresses the ERASE key 25 and the REW key 23.

(b) When the the ICM tape is stopped at its end after it is rewound and erased, the indicator 26 is turned off.

It should be noted that high-speed erasing operation is effective only when the apparatus is set in the STOP mode.

(23) Hand Control (a) A hand microphone (also called an external microphone or a disk tension microphone) unit 220 is connected to a corresponding jack to remote control the apparatus by the hand control function. In this case, the following relationships are established to achieve remote control with the hand microphone unit:

1 ... REWIND, 2 ... FORWARD (PLAY), 3 ... RECORD,
4 ... SIGNAL, 5 ... SIGNAL GND, 6 ... +5 V,
7 ... MICROPHONE SWITCH, 8 ... CUE SIGNAL, (the beep tone (40 Hz) is called a mark.)

(b) The ICM deck is operated by MEMO, PLAY2, REW2 and MARK switches arranged in the hand microphone unit.

(24) Counter Reset (a) The counter content can be reset when the ICM deck is set in the REW or ERASE mode.

Figure 4D:
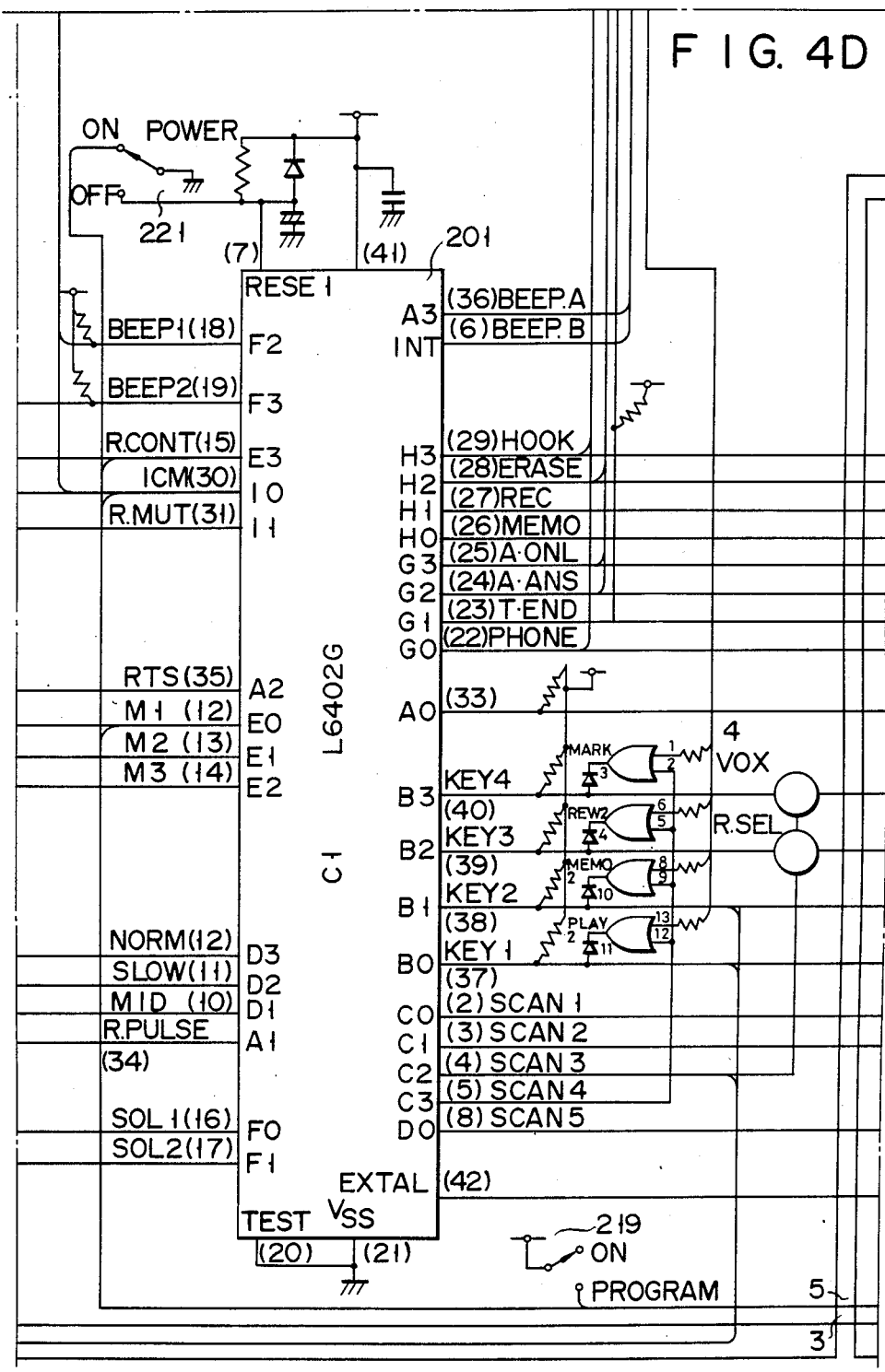
Figure 4E:
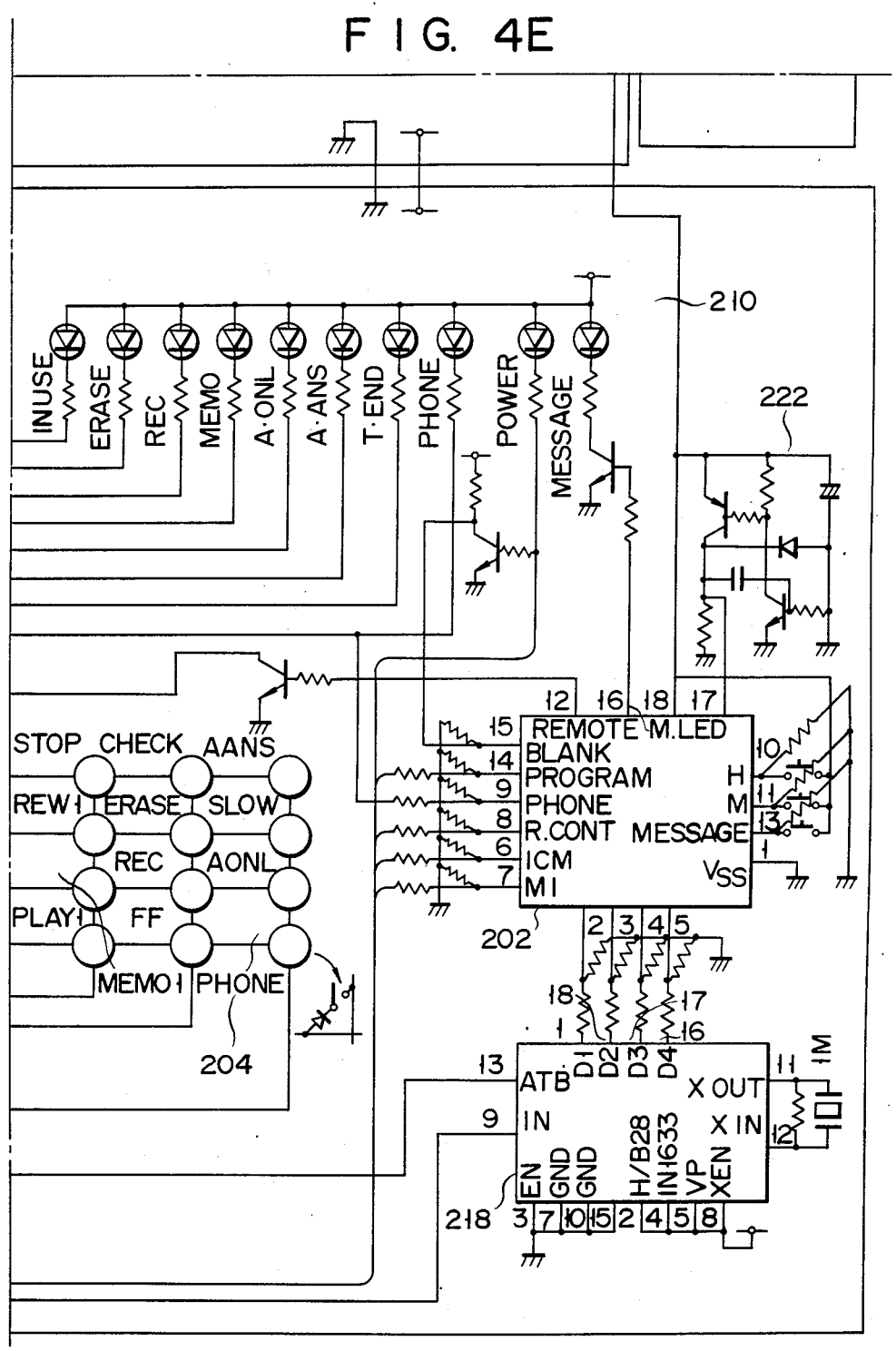

(25) POWER Switch Operation (a) A POWER switch 221 of FIGS. 2 and 4D which corresponds to the POWER key 13 of FIG. 1 comprises a push-push switch. When the POWER switch 221 is depressed once, the apparatus is energized, and the corresponding indicator 14 is turned on.

(b) When the POWER switch 221 is depressed again, the main CPU 201 is powered off. However, the sub CPU 202 is backed up by a backup battery 222. Therefore, the counter/timepiece function can be rendered operative (the same applies when a power failure occurs).

FIGS. 4A to 4E are circuit diagrams of the circuit of FIG. 2. The same reference numerals as in FIG. 2 denote the same parts in FIGS. 4A to 4E.

The main CPU 201 used in the arrangement of FIGS. 2 and 4A to 4E will be described:

1. Basic Specifications
1-1 IC
  N-MOS 4-bit microcomputer
1-2 Basic Functions
  (1) Mode control
  (2) Display
  (3) Solenoid control
  (4) Motor control
  (5) Audio amplifier control
  (6) Remote control function
  (7) BEEP tone output
  (8) BEEP detection
  (9) TAPE END detection
  (10) ICM length selection designation
  (11) RING SELECT designation
1-3 Other Basic Functions
  (1) POWER ON/RESET function
  (2) Chattering elimination function
1-4 Basic Operations
  (1) Deck transition operation
  (2) A.ANS operation
  (3) OGM operation
  (4) ICM-REC operation
  (5) SLOW operation
  (6) CHECK operation
  (7) OGM-REC operation
  (8) OGM/ICM operation
  (9) REMOTE operation
  (10) PHONE-REC operation
  (11) MARK operation by hand microphone
1-5 Other Specifications
  (1) Automatic answering standby state
  (2) EXTRA DELAY WHEN TAPE IS FULL
  (3) Response in AUTO ANSWER mode
  (4) Response in ANNOUNCE ONLY mode
2. Function Specifications
2-0 Symbols and Others
  (1) Symbols for keys, switches, and other symbols (see FIGS. 4A to 4E)

| Symbol | Name | Main Function |
|---|---|---|
| PLAY1 PLAY 2 | PLAY 1 PLAY 2 deck B | Designate PLAY mode in |
| MEMO1 MEMO2 | MEMO 1 MEMO 2 | Designate REC mode in deck B |
| REW1 | REW 1 | Designate REW mode in decks A and B |
| REW2 | REW 2 | Designate REW mode in deck B |
| MARK | MARK | Designate output of BEEP2 |
| STOP | STOP | Designate STOP mode in decks A and B |
| FF | FAST FORWARD | Designate FF mode in decks A and B |
| ERASE | ERASE | Designate ERASE mode in deck B |
| REC | RECORD | Designate REC mode in deck B |
| CHECK | CHECK RECORD | Designate PLAY mode in deck A |
| A.ANS | AUTO ANSWER | Designate AUTO ANSWER mode |
| PHONE | PHONE | Designate REC mode in deck B |
| A.ONL | ANNOUNCE ONLY | Designate ANNOUNCE ONLY mode |
| R.SLCT | RING SELECT | Designate the number of times of RING inputs |
| VOX | VOX/30" | Select ICM length |
| SLOW | SLOW | Switch tape speed in PLAY mode in deck B |
| C.S.1 | CASSETTE SENSOR 1 | Operate ON-detection switch for cassette cover A |
| Symbol | Name | Main-Function |
| C.S.2 | CASSETTE SENSOR 2 | Operate ON-detection switch for cassette cover B |
| H.P | Head Position Switch | Operate head position detection switch |
| M | Motor | Operate drive motor for decks A and B |
| RP1,RP2 | Reel Pulse | Generate tape end detection reel pulse |
| SOL | Solenoid | Actuate head drive solenoid for decks A and B |

(2) Output Terminals

| Symbol | Name | Main Function |
|---|---|---|
| $\overline{M1}$ | MOTOR 1 | Forward drive |
| $\overline{M2}$ | MOTOR 2 | Reverse drive |
| $\overline{M3}$ | MOTOR 3 | Control brake of motor |
| HOOK | HOOK CONTROL | Control ON/OFF of HOOK |
| 2.4 CM | 2.4 cm | Drive tape at 2.4-cm normal speed |
| MID | MIDDLE | Drive tape at middle speed |
| SLOW | SLOW | Drive tape at 1.2-cm normal speed |
| $\overline{T.END}$ | TAPE END | Indicate tape end |
| P.MUT | PLAY MUTE | Mute reproduce amp |
| $\overline{R.MUT}$ | REC MUTE | Mute record amp |
| REC.C | REC CONTROL | Switch record/reproduce amp |
| I.C.M. | INCOMING MESSAGE | Select head |
| $\overline{PHONE}$ | PHONE | Indicate PHONE mode |
| $\overline{A.ONL}$ | ANNOUNCE ONLY | Indicate ANNOUNCE ONLY mode |
| $\overline{SOL1}$ | SOLENOID 1 | Start energizing solenoid |
| $\overline{SOL2}$ | SOLENOID 2 | Hold solenoid |
| BEEP1 | BEEP 1 | Send beep signal through line |
| BEEP2 | BEEP 2 | Record beep signal |
| $\overline{ERASE}$ | ERASE | Indicate ERASE mode |
| REC | RECORD | Set REC mode by REC key |
| $\overline{MEMO}$ | MEMORY | Set REC mode by MEMO key |
| A.ANS | AUTO ANSWER | Indicate AUTO ANSWER mode |

(3) Input Terminals

| Symbol | Name | Main Function |
|---|---|---|
| R.PULS | REEL PULS | Detect reel rotation |
| R.M.T. | REMOTE | Input remote code |
| R.T.S. | RING TONE SIGNAL | Detect ring input |
| BEEP A | BEEP A/VOX | Detect BEEP A/voiceless portion |
| BEEP B | BEEP B | Detect BEEP B |

2-1 Mode Control

(1) Operation Key Input Specifications (a) The PLAY2, MEMO2, REW2, REW and MARK keys are able to set their modes only while they are operated.

(b) The keys, excluding the keys described in item (a) above, are latched until another mode is designated.

(c) Except for the REW1 and ERASE keys, the MEMO2 and MARK keys, and the A.ANS, A.ONL and REC keys, all keys are processed such that the first depression is effective, and subsequent depressions are ineffective.

(d) When the deck A is set in the PLAY mode while in the off-hook state (the $\overline{\text{HOOK}}$ output terminal is set at "L"), no key inputs are accepted.

(e) When the deck B is selected in the off-hook state, no key inputs are accepted.

(2) Mode Setting (a) The deck A is set in the PLAY mode when the CHECK key is depressed, or when the PLAY1 key is depressed or the off-hook state is established in the FF/REW mode of the deck A.

(b) The deck B is set in the PLAY mode when the PLAY1 or PLAY2 key is depressed or the PLAY code is entered from the R.M.T (remote) unit.

(c) The deck A is set in the REC mode when the A.ANS or A.ONL key is depressed together with the REC key. The REC mode is held while the REC key is kept depressed (the A.ANS or A.ONL key can be released).

(d) The deck B is set in the REC mode when the MEMO1, MEMO2 or PHONE key is depressed or the MEMO code is sent from the R.M.T unit.

(e) The deck A is set in the REW mode when the REW1 key is depressed while the deck A is set in a mode excluding the STOP mode.

(f) The deck B is set in the REW mode when the REW1 or REW2 key is depressed while the deck B is selected or the deck A is set in the STOP mode. The deck B is also set in the REW mode when the REW code is sent from the R.M.T unit.

(g) The deck A is set in the FF mode when the FF key is depressed while the deck A is in operation.

(h) The deck B is set in the FF mode when the FF key is depressed the deck B is selected or the deck A is in the STOP mode.

(i) The STOP mode is set when the STOP key is depressed.

(j) The deck B is set in the ERASE mode when the ERASE and REW1 keys are simultaneously depressed while the decks A and B are set in the STOP mode.

(k) The AUTO ANSWER mode is set when the POWER ON/RESET and A.ANS keys are depressed. This mode is cancelled upon depression of the A.ONL key.

(l) The ANNOUNCE ONLY mode is set when the A.ONL key is depressed. This mode is cancelled upon depression of the A.ANS key.

(3) Mode Cancel (a) Each mode is cancelled when another mode operation key is depressed or the R.M.T. code is entered.

(b) The REC mode of the deck A is cancelled after the BEEP2 (1 kHz) 1-sec $<t9>$ output is generated.

(c) The operation excluding that with the PHONE key in the deck B or the REC mode by the R.M.T. unit is cancelled when a period of t1 have elapsed after the BEEP2 (40 Hz) for a period of t9 output is generated.

(4) Input Operations for Decks A and B

| | | Input by Keys Apparatus of Present Invention | | | | | | | |
|---|---|---|---|---|---|---|---|---|---|
| | | STOP | PLAY1 | CHECK | MEMO1 | PHONE | REC | FF | REW1 | ERASE |
| Deck A | STOP | | (deck B) PLAY | PLAY | (deck B) REC | (deck B) REC | REC | (deck B) FF | (deck B) REW | (deck B) ERASE |
| | PLAY | STOP | | | | | | FF | REW | |
| | REC | STOP | | PLAY | | | | | | |
| | FF | STOP | | PLAY | | | REC | FF | REW | |
| | REW | STOP | | PLAY | | | REC | FF | REW | |
| Deck B | STOP | | PLAY | (deck A) PLAY | REC | REC | (deck A) REC | FF | REW | ERASE |
| | PLAY | STOP | | | REC | REC | | FF | REW | |
| | REC | STOP | PLAY | | REC | REC | | FF | REW | |
| | FF | STOP | PLAY | | REC | REC | | | REW | |
| | REW | STOP | PLAY | | REC | REC | | FF | | |
| | ERASE | STOP | PLAY | | REC | REC | | FF | REW | |
| | STOP BS | | | | | | | | | |

| | | Input by Hand Control | | | Input by Remote Control | | | | |
|---|---|---|---|---|---|---|---|---|---|
| | | PLAY2 | MEMO2 | REW2 | STOP | PLAY | SKIP | MEMO | REW | BS |
| Deck A | STOP | (deck B) PLAY | (deck B) REC | (deck B) REW | STOP | (deck B) PLAY | (deck B) SKIP | (deck B) REC | (deck B) REW | (deck B) BS |
| | PLAY | | | REW | | | | | | |
| | REC | | | | | | | | | |
| | FF | | | REW | | | | | | |
| | REW | | | REW | | | | | | |
| Deck B | STOP | PLAY | REC | REW | | PLAY | SKIP | REC | REW | BS |
| | PLAY | | REC | REW | STOP | | SKIP | REC | REW | BS |
| | REC | PLAY | | REW | STOP | PLAY | SKIP | REC | REW | BS |
| | FF | PLAY | REC | REW | STOP | PLAY | | REC | REW | BS |
| | REW | PLAY | REC | | STOP | PLAY | SKIP | REC | | |
| | ERASE | PLAY | REC | REW | STOP | PLAY | SKIP | REC | REW | BS |
| | STOP | | | | STOP | PLAY | | | REW | BS |
| | BS | | | | STOP | REW | SKIP | | | |

(5) List of Timers

| No. | Item | Symbol |
|-----|------|--------|
| 1 | Blanking drive time for deck B | t1 |
| 2 | AUTO ANSWER standby lock time | t2 |
| 3 | Tape end alarm | t3 |
| 4 | SOL1 energization time | t4 |
| 5 | P.MUTE time | t5 |
| 6 | R.MUTE time | t6 |
| 7 | ICM 30" limit time | t7 |
| 8 | BEEP1 output time | t8 |
| 9 | BEEP2 output time | t9 |
| 10 | BEEP A detection time | t10 |
| 11 | Normal speed TAPE END detection time (2.4 cm) | t11 |
| 12 | Normal speed TAPE END detection time (1.2 cm) | t12 |
| 13 | Middle speed TAPE END detection time | t13 |
| 14 | High speed TAPE END detection time | t14 |
| 15 | VOX length of time | t15 |
| 16 | VOX voiceless detection time | t16 |
| 17 | Deck transition time | t17 |
| 18 | ICM REC effective time | t18 |
| 19 | BEEP B detection reset time | t19 |
| 20 | Head standby time | t20 |
| 21 | Braking time | t21 |
| 22 | Deck A REC mode indication delay time | t22 |

2-2 Display (1) $\overline{\text{A.ANS}}$ Output (a) The A.ANS output is set at level "L" when the deck A is set in the PLAY or REC mode upon simultaneous depression of the CHECK and REC keys or the A.ANS and REC keys. The A.ANS output is also set at level "L" when the AUTO ANSWER mode is set and the standby state is established.

(b) The A.ANS output is set at level "H" in the AUTO ANSWER mode when the deck A is set in the PLAY or REC mode or in a state excluding the standby state.

(c) The states excluding the standby state in the AUTO ANSWER mode are defined as follows:

C-1: a state in which the decks A and B are set in a mode excluding the STOP mode; and C-2: a state during a period of t2 or until the A.ANS key is depressed after the decks A and B are set in the STOP mode.

(2) $\overline{\text{A.ONL}}$ Output (a) The A.ONL output is set at level "L" when the deck A is set in the PLAY or REC mode upon simultaneous depression of the CHECK and REC keys or the A.ONL and REC keys. The A.ONL output is also set at level "L" when the ANNOUNCE ONLY mode is set and the standby mode is set.

(b) The A.ONL output is set at level "H" in the ANNOUNCE ONLY mode when the deck A is set in the PLAY or REC mode or in a state excluding the standby state.

(c) The states excluding the standby mode in the ANNOUNCE ONLY mode are defined as follows:

C-1:

C-2: same as (1)-(c)

(3) $\overline{\text{REC}}$ Output (a) The REC output is set at level "L" while the deck A is held in the REC mode upon simultaneous depression of the A.ANS and REC keys or the A.ONL and REC keys.

(4) $\overline{\text{PHONE}}$ Output (a) The PHONE output is set at level "L" while the deck B is set in the REC mode upon depression of the PHONE key.

(5) $\overline{\text{MEMO}}$ Output (a) The MEMO output is set at level "L" while the deck B is set in the REC mode upon depression of the MEMO1 or MEMO2 key.

(6) $\overline{\text{ERASE}}$ Output (a) The ERASE output is set at level "L" while the deck B is set in the ERASE mode upon simultaneous depression of the ERASE and REW keys.

(7) $\overline{\text{T.END}}$ Output (a) The T.END output is repeatedly set at levels "L" and "H" at a frequency of 1 kHz within a period of t3 after a tape end is detected. Thereafter, the T.END output is set at level "L".

(b) The T.END output is set at level "H" when the tape end state is eliminated.

2-3 Solenoid Control (1) $\overline{\text{SOL1}}$ Output (a) The SOL1 output is set at level "L" within a period of t4 as soon as the decks A and B are set in the PLAY or REC mode.

(b) The level of the SOL1 output is held unchanged in the braking and deck transition operations. Thereafter, the SOL1 output changes in the same manner as in item (a) above.

(c) The SOL1 output is set at level "L" within a period of t20 when the power on/reset mode is set or one of the CS1 and CS2 keys is turned on.

(2) $\overline{\text{SOL2}}$ Output (a) The SOL2 output is held at level "L" while the decks A and B are set in the PLAY or REC mode.

(b) The level of the SOL2 output is held unchanged in the braking and deck transition operations. Thereafter, the SOL2 changes in the same manner as in item (a) above.

2-4 Motor Control (1) Outputs in Respective Modes

Control signals $\overline{M1}$, $\overline{M2}$ and $\overline{M3}$ are generated in the following combinations in accordance with the respective modes:

| Output Terminal | Mode | | | | | |
|---|---|---|---|---|---|---|
| | Deck A | | | Deck B | | |
| | PLAY REC.FF | REW | STOP | PLAY REC.FF | REW ERASE | STOP |
| $\overline{M1}$ | L | H | H | H | L | H |
| $\overline{M2}$ | H | L | H | L | H | H |
| $\overline{M3}$ | H | H | L | H | H | L |

(2) Outputs in Braking Operation (a) During the braking operation, the output has the same level as that in the STOP mode within a period of t21.

Figure 5:
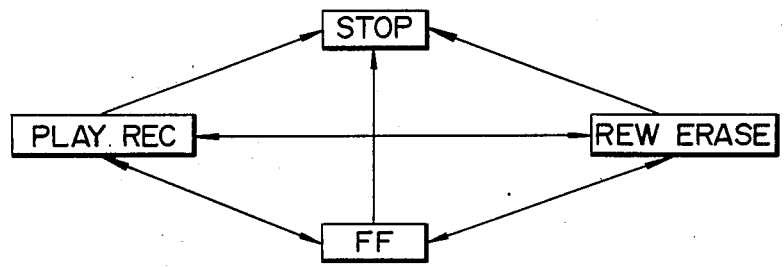
FIGS. 5 to 13 are respectively timing charts for explaining the operation of a main CPU shown in FIGS. 2 and 4.

(b) The braking operation is performed to directly change between the modes shown in FIG. 5.

(c) Key inputs excluding the braking operation are not accepted during the braking operation.

(d) The braking operation must be performed when a mode excluding the STOP mode is changed to the deck transition operation.

(3) Tape Speed (a) The following signals appear at the 2.4CM, MID and SLOW output terminals in accordance with the tape speed modes.

| Output Terminal | Mode | | | |
|---|---|---|---|---|
| | SLOW | 2.4 CM | MID | HIGH |
| 2.4 CM | L | H | L | L |
| MID | L | L | H | L |
| SLOW | H | L | L | L |

(b) The tape speed modes in the respective operating modes are as follows:

| Operation Mode | Tape Speed Mode |
|---|---|
| FF, REW, ERASE | HIGH |
| BS, SKIP | MID |
| SLOW (PLAY) | SLOW |
| Deck transition or other mode (PLAY, REC and STOP) | 2.4CM |

2-5 Audio Amplifier Control
(1) $\overline{\text{P.MUTE}}$ Output
    (a) The $\overline{\text{P.MUTE}}$ output is set at "L" when a period of t5 has elapsed after the REC mode is set upon operation of the PHONE key depressed in the PLAY mode, or after the REC and MID modes are set upon the ICM REC operation.
    (b) When the deck transition or braking operation is performed, the $\overline{\text{P.MUTE}}$ output changes in the same manner as in item (a) above after the deck transition or braking operation is completed.
(2) R.MUTE Output
    (a) The R.MUTE output is set at level "H" when a period of t6 has elapsed after the REC mode is set.
    (b) When the braking or deck transition operation is performed, the R.MUTE output is set at level "H" within a period of t6 after the braking or deck transition operation is completed.
(3) R.CONT Output
    (a) The R.CONT output is set at level "L" while the REC mode is set.
    (b) When the braking or deck transition operation is performed, the R.CONT output is set at level "L" after the braking or deck transition operation is completed.
2-6 Remote Function
(1) Reception of Remote Code
    (a) When the remote code is received at the R.M.T input terminal during OGM operation, any other key input is inhibited and the remote mode is set.
    (b) When a period of t2 has elapsed in the STOP mode set by the remote control unit, the A.ANS operation is performed. Thereafter, a selected one of the A.ANS and A.ONL modes is set. Inhibition of other key inputs is cancelled.
(2) Remote Code
    (a) Eight 4-bit serial codes #1REW, #2PLAY, #3SKIP, #4STOP, #5BACKSPACE, #6MEMO, #7A.ANS and #9A.ONL are received as remote codes. The data format of the 4-bit serial code is arbitrarily determined in association with the sub CPU 202.
    (b) Four remote codes, i.e., the REW, PLAY, STOP and MEMO codes respectively designate modes in the deck B.
    (c) The SKIP remote code is used to change the tape speed to MID while the deck B is set in the FF mode. Thereafter, when the BEEP B is detected, the PLAY mode is set.
    (d) The BACKSPACE remote code is used to set the tape speed to MID while the deck B is set in the REW mode. When the BEEP B is detected, the STOP mode is set.
    (e) The A.ANS and A.ONL remote codes select the A.ANS and A.ONL modes, respectively.
(3) TAPE END Operation in Remote Mode
    (a) When the tape end is detected in the remote PLAY or SKIP mode, the BACKSPACE mode is set.
    (b) When the tape end is detected in the remote REW mode, the STOP mode is set and the BEEP1 is generated for a period of t8.
2-7 Beep Tone Output
(1) Beep Tone Output Terminal
    (a) There are two output terminals BEEP1 and BEEP2.
(2) Beep Tone Output Operation
    (a) A beep tone having a frequency of 1 kHz appears at the BEEP1 output terminal. A beep tone having a frequency of 1 kHz or 40 Hz appears at the BEEP2 output terminal.
    (b) BEEP1 Output Operation
    (I) The BEEP1 is generated from the OGM operation in the A.ANS mode to the ICM REC operation through the deck transition operation.
    (II) The BEEP1 is generated for a period of t8 when a period of t7 have elapsed after the ICM REC operation is started under the condition wherein the VOX key is kept OFF.
    (III) The BEEP1 is generated for a period of t8 when the REW remote code is entered and the tape end is detected.
    (IV) The BEEP1 is generated for a period of t8 when the tape end is detected in the ICM REC operation.
    (c) BEEP2 Output Operation
    (I) The BEEP2 (1 kHz) is generated for 1 sec <t9> when the REC key is turned off after the deck A is set in the REC mode.
    (II) The BEEP2 (40 Hz) is generated for 1 sec <t9> when the STOP key is depressed after the deck B is set in the REC mode upon operation of the MEMO1 key.
    (III) The BEEP2 (40 Hz) is generated for a period of t9 when the ICM length is designated after a the ICM REC operation is completed. However, when one ICM REC cycle falls within a period of t18, operation (III) is not performed.
2-8 Beep Detection
(1) BEEP A Detection
    (a) When a period of t10 pulse of "L" level is supplied to the deck in the PLAY mode, the BEEP A is detected.
(2) BEEP B Detection
    (a) When, for example, N pulses of 1.5 msec to 20 msec are supplied to the deck B in the SKIP or BACKSPACE mode, the BEEP B is detected.
    (b) When no pulses are entered after a period of t19, the detection counter is reset to zero.
2-9 Tape End Detection
(1) Normal Speed Tape End
    (a) When the R.PULS input terminal is held at level "L" or "H" for over a period of t11 while the deck A is set in the PLAY or REC mode, the deck A is stopped and is set in the REW mode.
    (b) When the R.PULS input terminal is held at level "L" or "H" for over a period of t11 at the tape speed of 2.4 cm/sec or over a period of t12 at the tape speed of 1.2 cm/sec, the tape end alarm (1 kHz) is generated for a period of t3 and the STOP mode is then set.

(2) Middle Speed (MID) Tape End (a) When the R.PULS input terminal is held at level "L" or "H" for over a period of t13 while the deck B is set in the SKIP mode, the deck B is stopped and is set in the BACKSPACE mode.

(b) When the tape end is detected while the deck B is set in the BACKSPACE mode, the STOP mode is set.

(3) High Speed Tape End (a) When the R.PULS input terminal is held at level "L" or "H" for over a period of t14 while the deck A is set in the FF mode, the deck A is stopped and is set in the REW mode.

(b) When the tape end is detected while the deck A is set in the REW mode or the deck B is set in the FF or REW mode, the deck A or B is set in the STOP mode.

2-10 IMC Length Selection (1) VOX/30″

(a) When a period of t15 has elapsed after the ICM REC operation is completed or when a signal of level "L" is supplied to the BEEP A input terminal for a period of t16 under the condition wherein the VOX key is kept ON, the REC mode of the deck B is cancelled.

(b) When a period of t7 has elapsed in the ICM REC operation while the VOX key is kept OFF, the BEEP1 and the BEEP2 (40 Hz) are generated to cancel the REC mode of the deck B.

(c) When a signal of level "L" having a pulse width a period of t16 is supplied to the VOX input terminal between a period of t7 and a period of t16 in the ICM REC operation while the VOX key is kept OFF, the REC mode of the deck B is cancelled.

Figure 6:
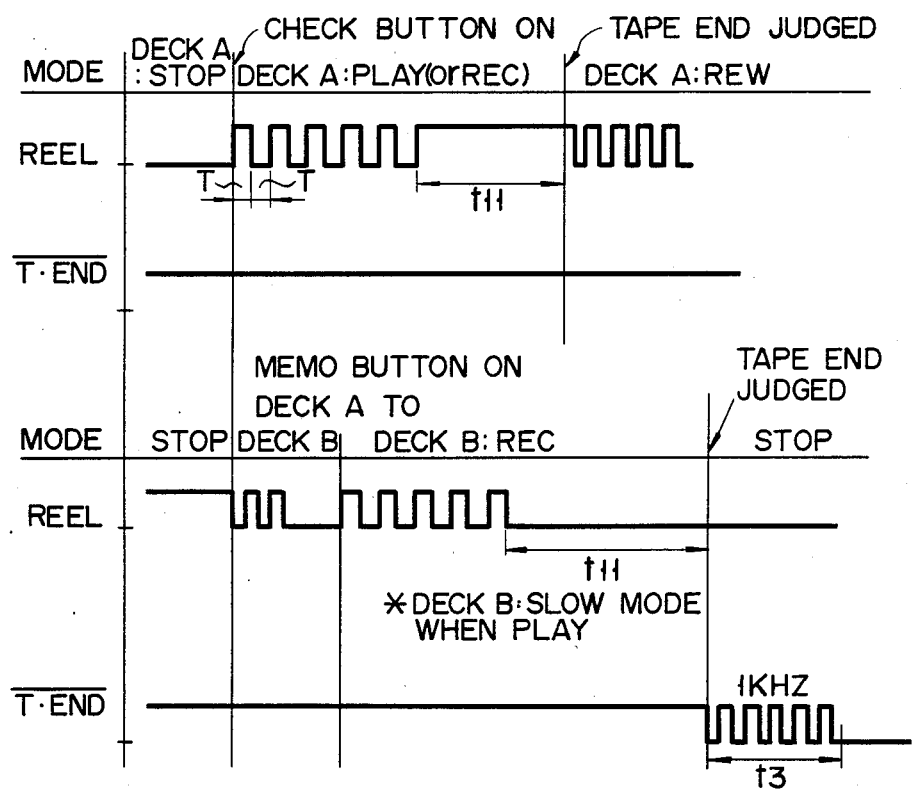

The tape end detection operation is summarized for individual tape speeds, and only the timing chart of the normal speed tape end detection is illustrated in FIG. 6.

|  | TAPE END Detection Mode | TAPE END Discrimination Time [$T_E$] | Mode after Discrimination | Alarm |
|---|---|---|---|---|
| Middle Speed | SKIP in deck B | t13 | BS | x |
| | BS in deck B | t13 | STOP | x |
| High Speed | FF in deck A | t14 | REW | x |
| | REW in deck A | t14 | STOP | o |
| | FF/REW in deck B | t14 | STOP | o |
| Normal Speed | PLAY/REC in deck A | t11 | REW | x |
| | PLAY(2.4)/REC in deck B | t11 | STOP | o |
| | PLAY(1.2) in deck B | t12 | STOP | o |

2-11 Ring Select Designation
(when the apparatus is set in the A.ANS or A.ONL standby state)

(1) When four ringing tone signals are supplied to the R.T.S input terminal while the R.SLCT key is kept ON, a signal of level "L" appears at the $\overline{\text{HOOK}}$ output terminal, and the OGM operation is started. However, when the ICM REC period exceeds t18 or even a single MEMO REC operation is performed, the following operation (2) is performed.

(2) When one ringing tone signal is supplied to the R.T.S input terminal while the R.SLCT key is kept OFF, a signal of level "H" appears at the $\overline{\text{HOOK}}$ output terminal.

(3) Even after the ICM REC or MEMO REC operation is performed in (1), four ringing tone signals cause the signal of level "L" to appear at the $\overline{\text{HOOK}}$ output terminal only when the deck B is set in the REW mode.

(4) The R.T.S waveform is given as follows: If the R.T.S signal has level "L", it lasts 2 seconds; however, if the R.T.S signal has level "H", it lasts 4 seconds. The R.T.S signal is counted at its leading edge.

3-1 Other Functions (1) Power On/Reset Function (a) The system initialization is performed when the power switch is turned on. The A.ANS operation is performed, and the automatic answering standby state in the A.ANS mode is initiated. In this case, the logic levels of the output terminals are given below:

| Output Terminal Name | Output Level | Output Terminal Name | Output Level |
|---|---|---|---|
| $\overline{\text{M1}}$ | H | I.C.M. | L |
| $\overline{\text{M2}}$ | H | $\overline{\text{PHONE}}$ | H |
| $\overline{\text{M3}}$ | L | $\overline{\text{A.ONL}}$ | H |
| $\overline{\text{HOOK}}$ | H | $\overline{\text{SOL1}}$ | H |
| 2.4 CM | H | $\overline{\text{SOL2}}$ | H |
| MID | L | BEEP1 | H |
| SLOW | L | BEEP2 | H |
| $\overline{\text{T.END}}$ | H | $\overline{\text{ERASE}}$ | H |
| P.MUT | H | $\overline{\text{REC}}$ | H |
| $\overline{\text{R.MUT}}$ | L | $\overline{\text{MEMO}}$ | H |
| REC.C | L | $\overline{\text{A.ANS}}$ | H |

(2) Chattering Elimination (a) A key input is effective when it continues for over 10 msec.

4-1 Deck Transition Operation 4-1-1 Deck A Transition Operation (a) A period of t17 pulse of level "L" and a period of t21 pulse of level "H" appear at each of the $\overline{\text{SOL1}}$ and $\overline{\text{M1}}$ output terminals. The period of <t17+t21> pulse of level "H" appears at the $\overline{\text{M2}}$ output terminal. A period of t17 pulse of level "H" and a period of t21 pulse of level "L" appear at the $\overline{\text{M3}}$ output terminal.

(b) The deck A transition operation can be initiated only when the deck B is set in the STOP mode.

(c) Key input and remote control input cannot be received in the deck transition operation.

Figure 7:
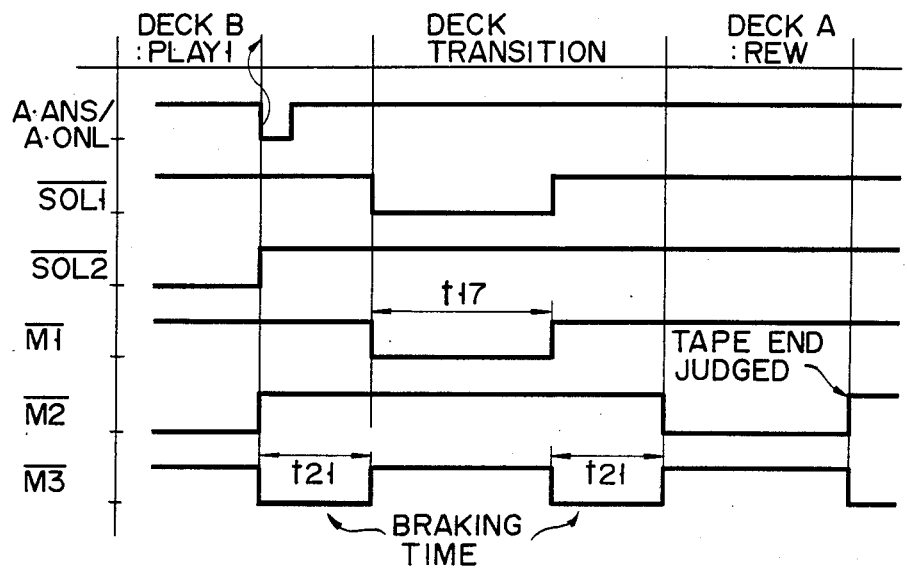

The timing chart for exemplifying the deck A transition operation is illustrated in FIG. 7.

4-1-2 Deck B Transition Operation (a) A period of t17 pulse of level "L" and a period of t21 pulse of level "H" appear at each of the $\overline{\text{SOL1}}$ and $\overline{\text{M2}}$ output terminals. The period of <t17+t21> pulse of level "L" appears at the $\overline{\text{M1}}$ output terminal. A period of t17 pulse of level "H" and a period of t21 pulse of level "L" appear at the $\overline{\text{M3}}$ output terminal. The designated mode output operation can then be performed.

(b) The deck B transition operation can be performed only when the deck A is set in the STOP mode.

(c) Key input and remote control input cannot be received in the deck transition operation.

Figure 8:
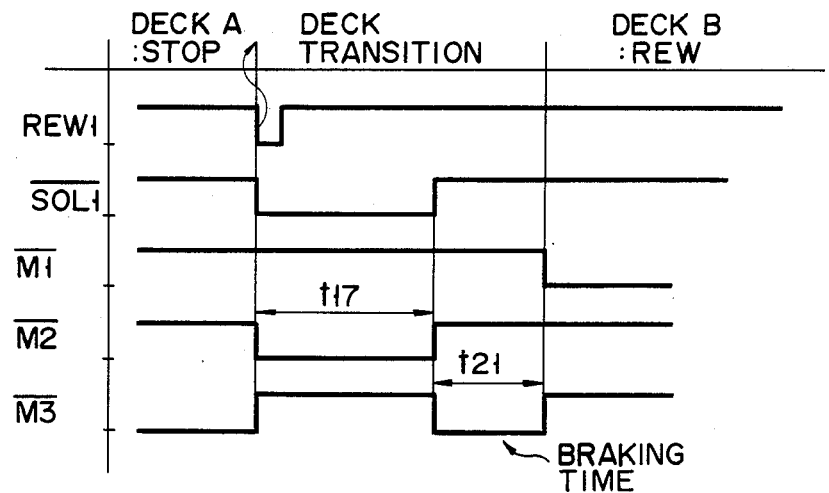
Figure 9:
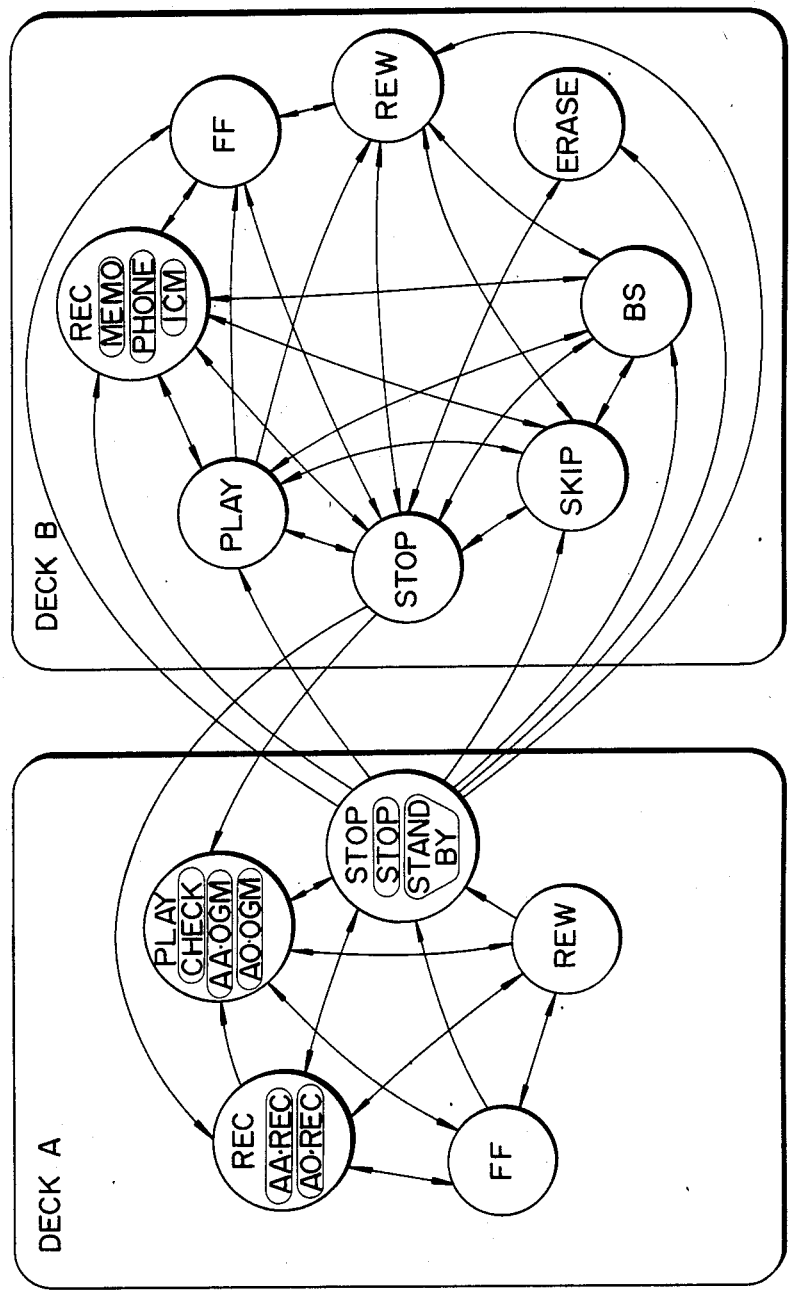

The timing chart for exemplifying the deck B transition operation is illustrated in FIG. 8, and FIG. 9 shows the main mode transition diagram between the decks A and B.

4-2 A.ANS Operation

The deck A transition operation is performed and the deck A is set in the REW mode. When the tape end is detected, the deck A is set in the STOP mode.

4-3 OGM Operation (a) When the ring select operation is completed, the deck A is set in the PLAY mode. When the BEEP A is detected, the deck A is set in the STOP mode.

4-4 ICM-REC Operation

When the OGM operation is performed, the REC mode is set after the deck B transition operation.

4-5 Slow Operation

When the SLOW key is depressed while the deck B is set in the PLAY mode, all the tape speed outputs (2.4CM, MID and HIGH) are set at level "H". When the SLOW key is depressed again while the deck B is set in the PLAY mode, only the 2.4CM output among the tape speed outputs becomes level "L". When one of the STOP, REW1 and FF keys is depressed at the slow speed, the tape speed changes to the corresponding speed.

4-6 Check Operation (a) When the CHECK key is depressed, the deck A is set in the PLAY mode. When the BEEP A is detected, the deck A is set in the REW mode.

4-7 OGM-REC Operation (a) The deck A is held in the REC mode while the REC and A.ANS keys or the REC and A.ONL keys are simultaneously depressed and then the REC key is held down. When the REC key is released, the BEEP2 (1 kHz) is generated from the BEEP2 output terminal for a period of t9. In this state, the REC mode is cancelled, and the deck A is set in the REW mode. When the tape end is detected, the deck A is set in the STOP mode.

Figure 10:
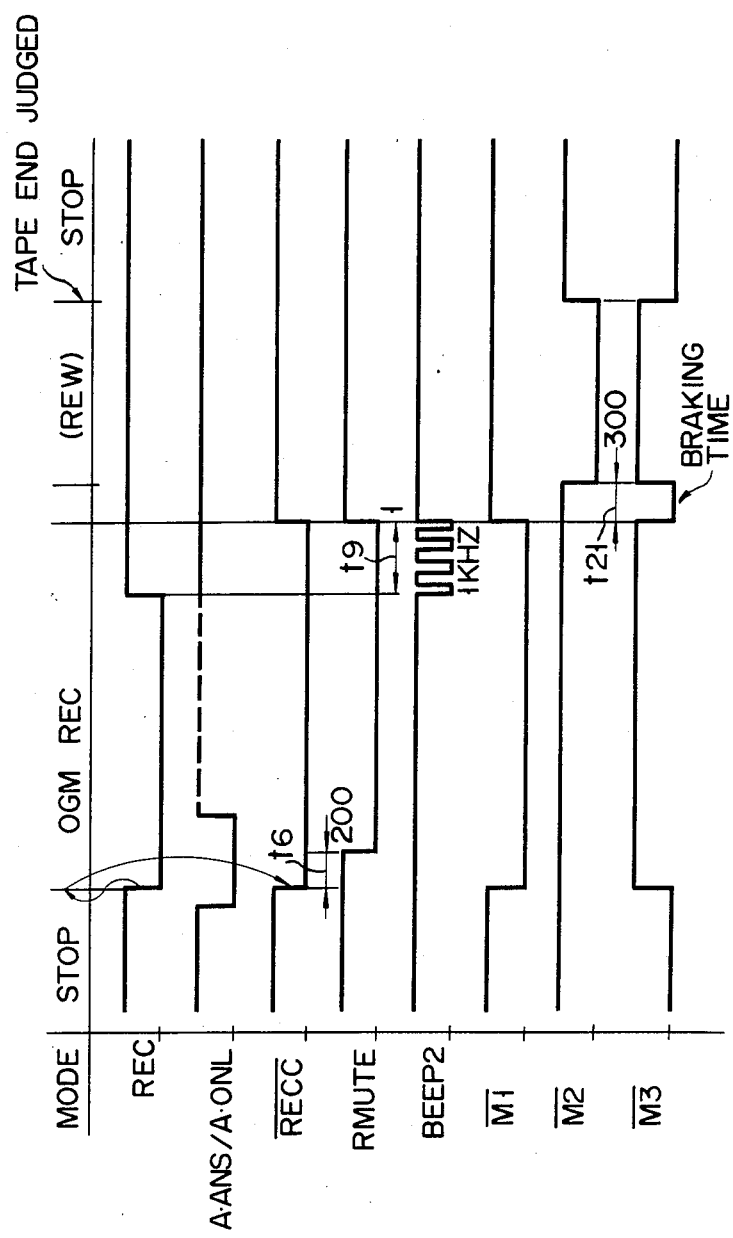

The timing chart of the OGM-REC operation is illustrated in FIG. 10.

4-8 OGM/ICM Operation (a) When the ringing tone signal is detected, the deck A is set in the PLAY mode. When the BEEP A is detected, the deck B is set in the REC mode. When recording is completed upon reception of the VOX input, the decks A and B are set in the STOP mode. Thereafter, the deck A is set in the REW mode. When the tape end of the tape in the deck A is detected, the deck A is set in the STOP mode.

Figure 11:
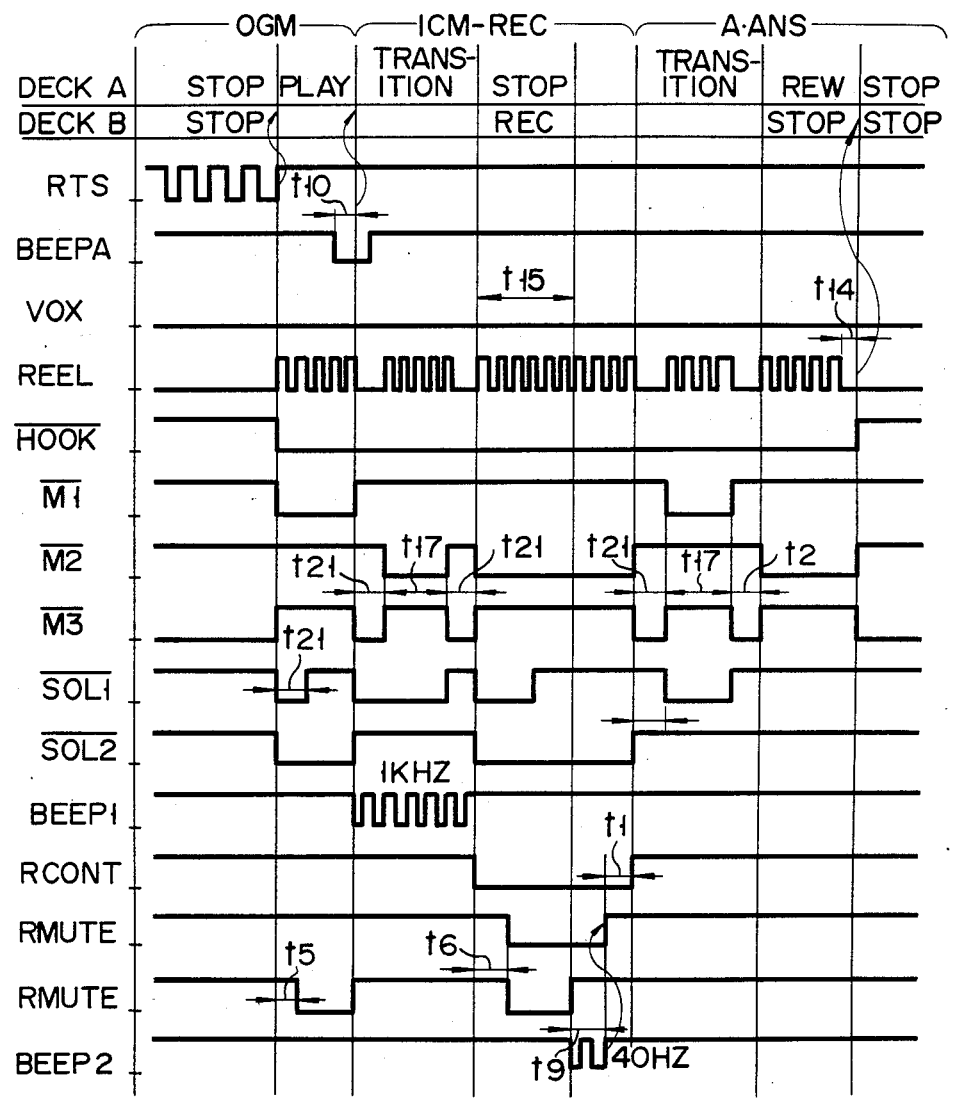

The timing chart of this operation is illustrated in FIG. 11.

4-9 Remote Operation (see 2-6)

(a) When the remote code is received at the R.M.T input terminal while the OGM is being sent to the caller, the corresponding mode is set.

Figure 12:
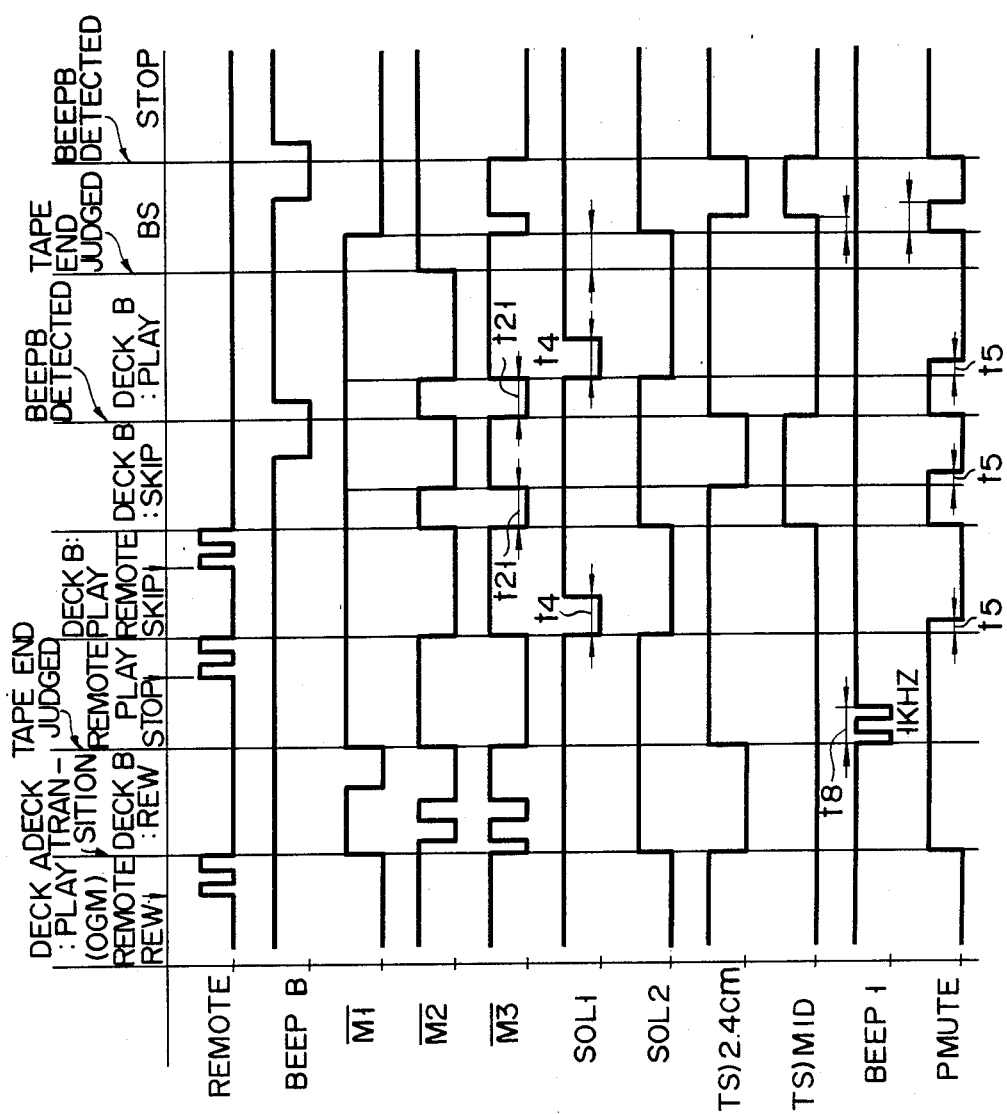

The timing chart of this operation is illustrated in FIG. 12.

4-10 Phone REC Operation (a) When the PHONE key is depressed, the deck B is set in the REC mode.

Figure 13:
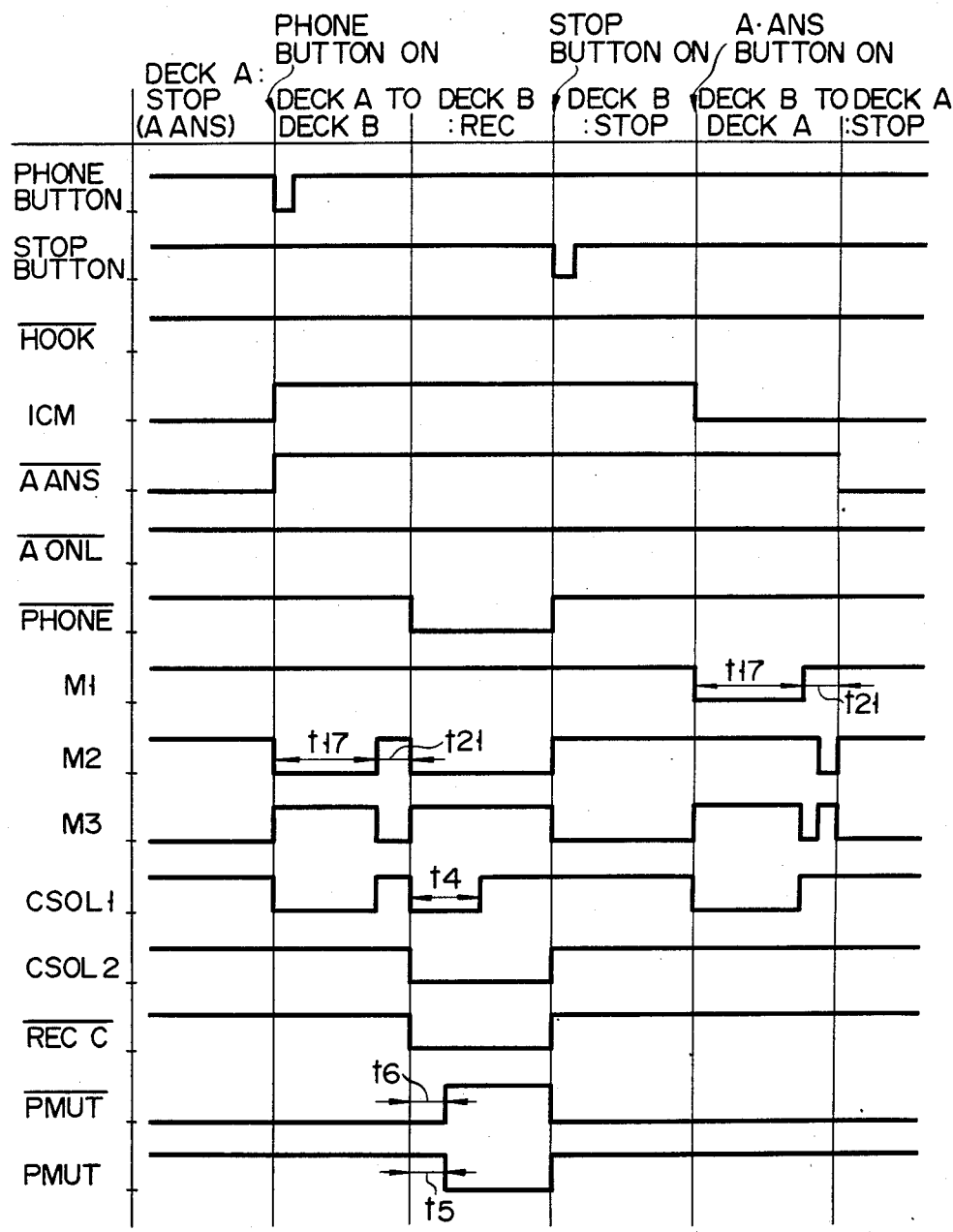

The timing chart of this operation is illustrated in FIG. 13.

4-11 Mark Operation by Hand Microphone Unit (a) When the MARK input is received while the deck B is set in the REC mode upon operation of the MEMO2 key in the hand microphone unit, the BEEP2 (40 Hz) is generated.

Figure 14:
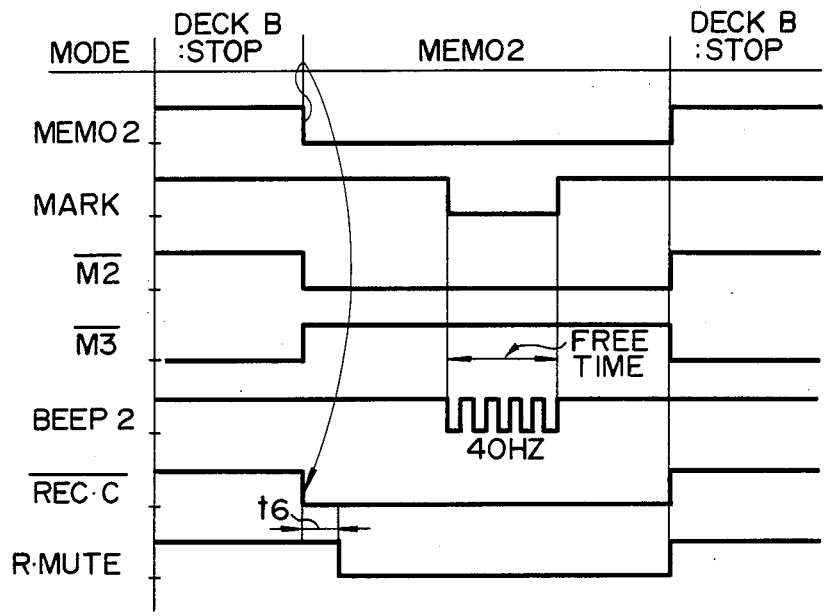
FIGS. 14 and 15 are respectively timing charts for explaining the operation of a sub CPU shown in FIGS. 2 and 4.

The timing chart of this operation is illustrated in FIG. 14.

5-1 Transition to A.ANS or A.ONL Standby State (a) When the STOP mode of the deck B continues for a period of t2 upon operation of the keys of the apparatus or upon remote control operation, the A.ANS or A.ONL standby state is obtained in accordance with the selected one of the A.ANS and A.ONL modes.

(b) When the ICM-REC operation is completed, the $\overline{\text{HOOK}}$ output terminal is set at level "H" after the A.ANS operation is completed. The A.ANS standby state is established.

(c) When the deck A is held in the STOP mode for a period of t2, the deck A is set in the REW mode. When the tape end is detected, the A.ANS or A.ONL standby state is obtained in accordance with the selected one of the A.ANS and A.ONL modes.

(d) When the REC mode of the deck A is cancelled, the deck A is set in the REW mode. When a period of 12 seconds has elapsed after the tape end in the deck A is detected, the deck A is set in the A.ANS or A.ONL standby state in accordance with the selected one of the A.ANS and A.ONL modes.

(e) When the A.ANS or A.ONL key is turned on before a period of t2 elapse in the above operations (a), (b) and (c), the corresponding standby state is initiated as soon as the A.ANS or A.ONL key is turned on.

5-2 Extra Delay When Tape is Full (a) When the tape end is detected in the ICM-REC operation, the BEEP1 is generated. When the A.ANS operation is completed, the $\overline{\text{HOOK}}$ output terminal is set at level "L", and the A.ANS or A.ONL standby state is set.

(b) After the above operation (a) ends, the $\overline{\text{HOOK}}$ output terminal is kept at level "L" by 15 ringing tone signals even if the ring selection is designated until any other input is received.

(c) When the REW1, REW2 or remote control REW code is received, the delay in item (b) above is cancelled.

(d) The remote control input is accepted during the OGM operation.

5-3 AUTO ANSWER Mode Response (1) The $\overline{\text{HOOK}}$ output terminal is set at level "L" in accordance with the predetermined number of ringing tone signals, i.e., 15 ringing tone signals for extra delay or 4 ringing tone signals for ring selection, and with the presence/absence of ICM-REC or MEMO REC.

(2) The ICM-REC operation is performed and completed in accordance with the ICM length designation after the OGM operation ends.

(3) Transition 5-1-(b) is performed.

5-4 ANNOUNCE ONLY Mode Response (1) Same as in 5-3-1

(2) The deck A is set in the REW mode after the OGM operation ends. When the tape end in the deck A is detected, the $\overline{\text{HOOK}}$ output terminal is set at level "L". At the same time, the deck A is set in the A.ONL mode standby state.

The next table shows outputs of the above-mentioned respective modes.

| Deck A | | | | | Explanation of symbol within |
|---|---|---|---|---|---|
| STOP | PLAY | REC | FF | REW | parentheses |

-continued

| | | | | | | | |
|---|---|---|---|---|---|---|---|
| Motor | M1̄ | H | L | L | L | H | |
| control | M2̄ | H | H | H | H | L | |
| | M3̄ | L | H | H | H | H | |
| Tape | 2.4 CM | H | H | H | L | L | |
| speed | MID | L | L | L | L | L | |
| | HIGH | L | L | L | H | H | |
| Amp | P.MUT | H | L | H | H | H | |
| control | R.MUT | H | H | L | H | H | |
| | REC.C̄ | H | H | L | H | H | |
| Display | ERASĒ | H | H | H | H | H | |
| | REC̄ | H | H | H(L) | H | H | REC mode by REC key |
| | MEMŌ | H | H | H | H | H | |
| | A.ONLȲ | | | | | | |
| | A.ANS̄ | | | | | | |
| | PHONĒ | H | H | H | H | H | |
| Solenoid | SOL1̄ | | | | | | |
| control | SOL2̄ | H | L | L | H | H | |
| Beep | BEEP1 | | | | | | |
| output | BEEP2 | | | | | | |
| Others | HOOK̄ | | | | | | |
| | T.END̄ | | | | | | |
| | ICM | | | | | | |

| | | Deck B | | | | | Explanation of symbol within |
|---|---|---|---|---|---|---|---|
| | | PLAY | REC | FF | REW | ERASE | parentheses |
| Motor | M1̄ | H | H | H | L | L | |
| control | M2̄ | L | L | L | H | H | |
| | M3̄ | H | H | H | H | H | |
| Tape | 2.4 CM | H(L) | H | L | L | L | SLOW mode |
| speed | MID | L | L | L(H) | L(H) | L | FF/REW mode during B.S.SKIP |
| | HIGH | L | L | H(L) | H(L) | H | |
| Amp | P.MUT | L | H(L) | H | H | H | REC mode for ICM |
| control | R.MUT | H˙ | L | H | H | H | |
| | REC.C̄ | H | L | H | H | L | |
| Display | ERASĒ | H | H | H | H | L | |
| | REC̄ | H | H | H | H | H | |
| | MEMŌ | H | H(L) | H | H | H | REC mode by MEMO key |
| | A.ONLȲ | | | | | | |
| | A.ANS̄ | | | | | | |
| | PHONĒ | H | H(L) | H | H | H | |
| Solenoid | SOL1̄ | | | | | | |
| control | SOL2̄ | L | L | H | H | H | |
| Beep | BEEP1 | | | | | | |
| output | BEEP2 | | | | | | |
| Others | HOOK̄ | | | | | | |
| | T.END̄ | | | | | | |
| | ICM | | | | | | |

The sub CPU 202 used in FIGS. 2 and 4A to 4E will be described hereinafter.

1. Basic Specifications
1-1 Basic Functions

The microcomputer for the sub CPU 202 has the following basic functions.

(a) Time display
(b) Time correction
(c) Security code setting and display
(d) Security code detection
(e) Remote code detection
(f) Remote code output (g) Message count and display
(h) Power on/reset 1-2 Input and Output Terminals (a) The main functions of the input and output terminals are summarized as follows:

|  | Terminal name | Main Function |
|---|---|---|
| Input | MEMO | Set time or security code |
|  | H | Count up hour or security code |
|  | M | Write minute or security code or carry its digit |
|  | MESSAGE | Display at message counter |
|  | D1 |  |
|  | D2 | Serve as input terminals for security and remote codes |
|  | D3 |  |
|  | D4 |  |
|  | ICM |  |
|  | $\overline{M1}$ |  |
|  | $\overline{R.CONT}$ | Serve as input terminals for message count, reset and remote mode reset |
|  | PHONE |  |
|  | BLANK | Inhibit display of security code |
| Output | REMOTE | Generate remote code |
|  | M.LED | Indicate messagge |

Note
[1] A counter display drive output terminal is omitted.
[2] MEMO, H, M and MESSAGE inputs prevent chattering of Tc msec (An input of Tc msec or longer is made effective).

2. Specifications 2-1 Time Display

The current time is displayed when the M input terminal and the MESSAGE input terminal are set at level "L" and time correction is not performed.

2-2 Time Correction (a) When the H input terminal goes high while the time is displayed, the "hour" digit is counted up. Thereafter, when the H input terminal is held at level "H" for 1.5 sec, the hour digit is incremented at a speed of 2 to 3/sec.

(b) When the count changes from 11 to 12, AM/PM display is switched.

(c) When the M input terminal goes high, the "minute" digit is counted up. Thereafter when the M input terminal is kept high for 1.5 sec, the minute digit is incremented at a speed of 2 to 3/sec.

(d) Even if the minute digit changes from 59 to 0, the hour digit does not change.

(e) The "second" digit is reset when minute correction is performed.

2-3 Security Code Setting (a) A 3-digit (each digit is selected from among digits 1 to 9) security code is stored in the microcomputer.

(b) When the PROGRAM input terminal goes high, the timepiece function is switched to the security code display function, so that the stored code is displayed.

(c) When the BLANK input terminal is set at level "L", the security code will not be displayed even if the MEMO input terminal is set at level "H".

(d) When the M input terminal goes high while the security code is displayed, the units digit flashes at a period of 1 second.

(e) When the M input terminal returns to level "L" and then goes "H" level, the tens digit flashes.

(f) When signals of level "H" are sequentially entered, the following operation is performed: hundreds digit flash, hundred's stop digit flashing, and unit's digit flash.

(g) When the H input terminal goes high while a digit flashes, this digit is counted up. Even if the H input terminal is kept high, only step count-up is performed.

(h) When the PROGRAM input returns to level "L", the displayed numeral is stored as the security code.

(i) When the BLANK input terminal is set at level "L", the timepiece display is performed. In this case, the H, M, MEMO and MESSAGE key inputs cannot be accepted.

2-4 Security Code Detection (a) The security code BCD (1 to 9) is entered to the D1 to D4 input terminals from hundred's to unit's digit.

(b) When the same code as the security code stored in the microcomputer is entered for over 65 msec, the input code becomes effective.

(c) When an effective next digit code is not entered for 5 sec after the upper digit input code is effective, all the effective digit codes are reset in response to the * input ("1011" BCD code input).

(d) When all the 3-digit code is effective, the reset mode is set.

2-5 Remote Code Detection (a) The inputs (BCD 1 to 9) at the D1 to D4 input terminals in the remote mode are entered as a remote code.

(b) When the BCD inputs to the D1 to D4 input terminals continue for over 65 msec, these inputs are regarded as effective inputs. A 65-msec or longer off time is regarded as effective.

(c) The remote code is effective when the code has one digit.

2-6 Remote Code Output (a) When the remote code is effective, a start bit of level "L" appears at the REMOTE output terminal for 58 msec. Subsequently, pulses having a 31-msec period are generated as a remote code (BCD 1 to 9).

Figure 15:
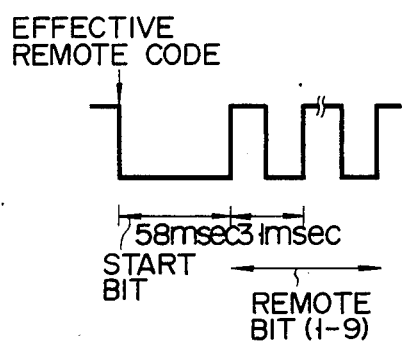

The output waveform of the remote code is shown in FIG. 15.

(b) Every time the effective code is entered, the remote code is generated in the remote mode.

(c) The remote mode is reset when the ICM input becomes level "L", and security code detection mode is set.

(d) The remote code is accepted when a period of 100 msec has elapsed after the security code is accepted.

2-7 Message Count (a) A 0-99 message counter is arranged in the microcomputer.

(b) When the MESSAGE input terminal is set at level "H", the content of the message counter is displayed. This display continues while the MESSAGE input terminal is kept high.

(c) When the ICM input terminal, the $\overline{R.CONT}$ input terminal and the $\overline{PHONE}$ input terminal are respectively kept high, low and high for 12 seconds, the content of the message counter is counted up.

(d) The next counting will not be performed unless the ICM input terminal goes low.

(e) The M.LED output terminal is alternately set at levels "H" and "L" at a period of one second unless the content of the message counter is 0. However, when the counter content represents 0 or the BLANK terminal is set at level "L", the M.LED output is set at level "L".

(f) When the ICM input terminal and the M1 input terminals are respectively set at levels "H" and "L" for over 500 msec, the content of the counter is reset.

2-8 Power On/Reset (a) The states in the following table are set in accordance with the power on/reset operation.

| Mode | Security code detection mode |
|---|---|
| Time display | AM 12:00 (flashing) |
| Message counter | 0 |
| Security code | 111 |
| REMOTE output | "L" |
| M. LED output | "L" |

(b) The H or M key is operated to cancel the flashing timepiece display when the MEMO is set at level "L".

2-9 Others (a) The digits D1 to D4 have the following relationship:

| Digit | D4 | D3 | D2 | D1 |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |
| * | 1 | 0 | 1 | 1 |
| # | 1 | 1 | 0 | 0 |

The remote control transmitter for simple remote control will be described.

Figure 16:
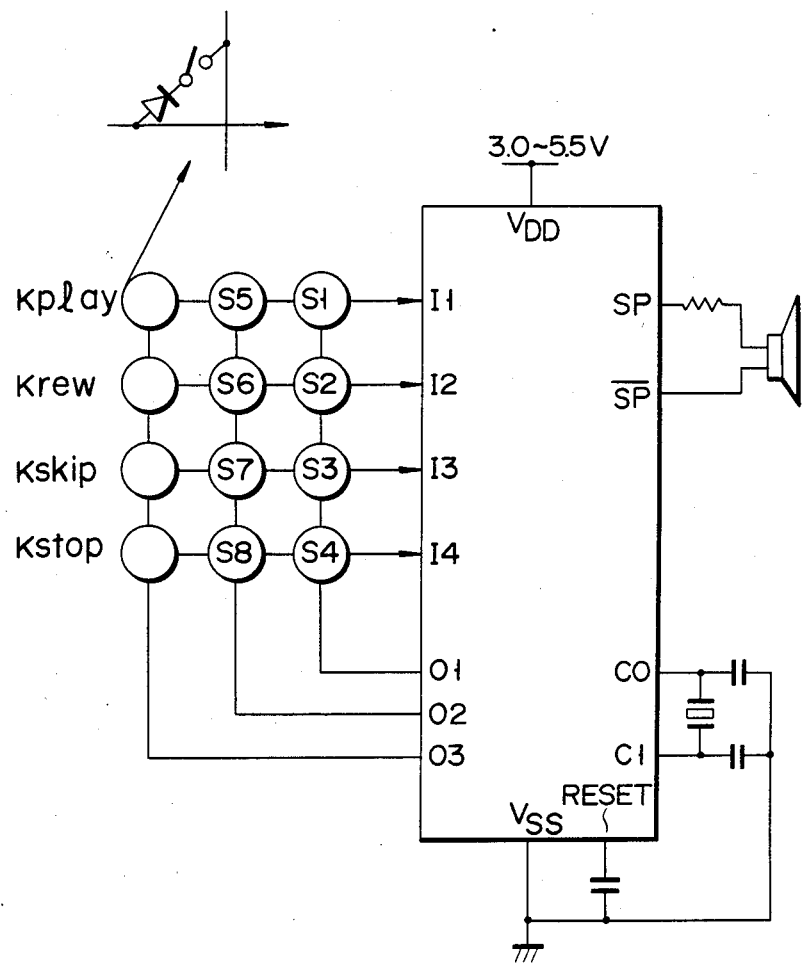
FIG. 16 is a diagram showing a peripheral circuit arrangement of a remote control transmitter used in the circuit shown in FIGS. 2 and 4.

FIG. 16 shows a peripheral circuit diagram of the remote control transmitter. [1] Terminals and [2] Operating Specifications are described as follows.

[1] Terminals
1. Input and Output Terminals

| | Terminal name | Function |
|---|---|---|
| Input terminal | 11 | S1, S5, Kplay key input |
| | 12 | S2, S6, Krew key input |
| | 13 | S3, S7, Kskip key input |
| | 14 | S4, S8, Kstop key input |
| Output terminal | 01 | S1, S2, S3, S4 key selection |
| | 02 | S5, S6, S7, S8 key selection |
| | 03 | Kplay, Krew, Kskip, Kstop key selection |
| | SP | Speaker drive (normal phase) |
| | $\overline{SP}$ | Speaker drive (inverted phase) |

2. Other Terminals

A reset terminal, an oscillation circuit input terminal, etc.

[2] Operating Specifications
1. Key Input
1-1 Security Code (a) An 8-bit code is entered by the S1 to S8 keys.

(b) The code is set at level "0" when the key is turned off. However, the code is set at level "1" when the key is turned on.

1-2 Operation Key Code (a) Operation of the Kplay, Krew, Kskip and Kstop keys causes generation of the PLAY, REW, SKIP and STOP codes and a remote signal including a security code.

(b) A simultaneous depression generates a STOP key code.

(c) The 2-bit PLAY, REW, SKIP and STOP key codes are defined in the following table.

| Mode | Remote code | |
|---|---|---|
| PLAY | 0 | 1 |
| REW | 1 | 0 |
| SKIP | 1 | 1 |
| STOP | 0 | 0 |

Figure 17:
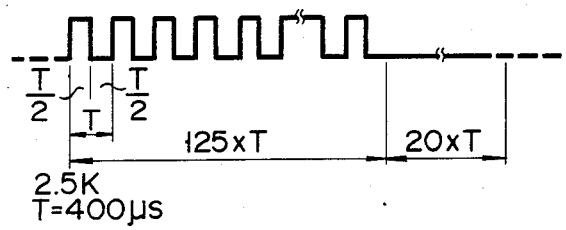
FIGS. 17 to 20 are respectively timing charts for explaining the operation of the transmitter shown in FIG. 16.
Figure 18:
Figure 19:
Figure 20:
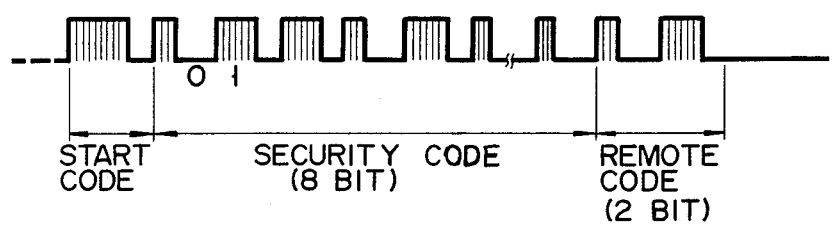

2. Remote Signal Output
2-1 Unit Codes
    (a) Start Code
    The start code is illustrated in FIG. 17.
    (b) Code "0"
    The code "0" is illustrated in FIG. 18.
    (c) Code "1"
    The code "1" is illustrated in FIG. 19.
2-2 Remote Output Signal (a) The remote output signal comprises the start code, the security code and the remote code, as shown in FIG. 20.

(b) When the operation keys are continuously depressed, a T-msec OFF time ("L" output) is provided after the first remote signal is generated. Thereafter, the remote signal is generated.

(c) During the OFF time, the SP and $\overline{SP}$ output terminals are set at level "L". However, when a code is generated, the output at the $\overline{SP}$ output terminal is an inverted signal of the output at the SP output terminal.

The main features of the above embodiment of the present invention will be described.

First, when the OGM and ICM decks A and B are switched in accordance with a one-motor two-drive system, the tape recorder mechanism is controlled in accordance with a proper logic level combination of the signals M1, M2 and M3, as described in item 2-4 of the main CPU 201, so as to set the decks A and B in proper modes. In this manner, a simple multifunctional arrangement can be mechanically and electrically obtained to achieve proper operation.

Second, as described in item 2-3 (security code setting and display which accomplish remote control in response to the security code) of the sub CPU 202, the security code is set and displayed under the direct control of the sub CPU 202. However, the display operation is performed through the main CPU 201.

As previously described, the sub CPU 202 is backed up by the backup battery 222 even after the main CPU 201 is turned off. The sub CPU 202 retains the storage content after the apparatus is turned off. For this reason, unless the above arrangement is provided, a party other than the subscriber can see the security code using the remote control unit, thus failing to guarantee secrecy of information. However, according to the apparatus of this embodiment, such failure can be completely eliminated making multifunctional operations possible.

Third, as described in item 4-1 of the main CPU 201, neither the key input nor the remote control input are accepted in the deck transition operation. As a result, the deck transition operation is properly performed contributing to efficient multifunctional operations.

Fourth, as described in item 2 of the remote control transmitter, in order to set the security code for remote control, the b 8-bit security code is added to the start bit to constitute a serial code so as to satisfy conditions required for the security code.

Fifth, in order to enable remote control operation using the remote control transmitter, the 2-bit serial code representing one of the PLAY, REW, SKIP and STOP modes is added to the serial code consisting of the start code and the security code, thus generating the remote code output. This makes multiple functions possible with a simple structure.

The control function which is specifically considered in the above embodiment will be described hereinafter.

Here such a control function is defined as a control function wherein the A.ONL mode is automatically set when the tape end in the ICM deck is detected in the A.ANS mode.

The reason this control function is required will first be described. When an ICM (caller's message) is recorded in the automatic telephone answering apparatus in the A.ANS (AUTO ANSWER) mode, the tape in the ICM deck reaches its end after a predetermined number of messages (recording time). In this case, the automatic telephone answering apparatus will not respond to the caller regardless of the ring selection state even if 15 or fewer ringing tone signals are received since the tape end state is stored in the main CPU 201 and the hook terminal is closed so as not to receive the next call. The user or subscriber of this automatic telephone answering apparatus knows this fact and recognizes the tape end state. When the sixteenth ringing tone signal is generated, the OGM mode is set, and the ICM deck is rewound by remote control operation. The user can thus hear the ICMs. Thereafter, the user erases these ICMs and sets the apparatus in the A.ANS mode.

In this case, when a caller who does not know the above situation wishes to leave a message and sends the sixteenth ringing tone, the OGM mode is set. In this case, although the A.ANS message is sent to the caller, the caller cannot record his message and may be irritated. This situation is not desirable.

According to the control function described above, the user can select one of two alternatives. That is, the tape end state in the ICM deck is left unchanged, or the A.ONL (ANNOUNCE ONLY) mode is automatically set. In the latter case, when the tape end state in the ICM deck is set, the A.ONL mode is immediately initiated. Even if a caller does not know the operating state of the apparatus, the A.ONL message is sent to the caller who can then understand that the called party is out.

In order to set the A.ONL mode when the tape in the ICM deck is full, the user simultaneously depresses the A.ANS key 31 and the A.ONL key 33 in advance. This key input is stored in the main or sub CPU 201 or 202. When the tape end in the ICM deck is detected in the first A.ANS mode cycle, the main or sub CPU 201 or 202 generates a control signal to automatically initiate the A.ONL mode.

The A.ONL mode can be automatically set in response to the control signal in such a manner that an END signal upon tape end detection is coupled to the A.ONL key input under the control of the main CPU 201.

In summary, the apparatus can be controlled so that the A.ONL mode is automatically set when the tape end in the ICM deck is detected in the A.ANS mode.

A separate mode selection switch can be arranged to achieve the above operation.

Although a second embodiment will be described wherein reliability in the remote control operation is improved, the background thereof will first be described.

The automatic telephone answering apparatus operated in the AUTO ANSWER (A.ANS) mode records an ICM from the caller, and the subscriber can send a remote control REW code to the apparatus to rewind the ICM deck, so that the subscriber can monitor the recorded ICM.

The remote control operation is performed in response to the remote control signal which is generated upon operation of a key of the remote control transmitter or the pushbutton of the telephone and is sent to the apparatus through the telephone line. The remote control signal receiver (corresponding to the DTMF receiver 218) in the automatic telephone receiving apparatus receives the remote control signal mixed with the OGM speech signal.

The remote control signal itself is sent by a dual tone (DT) and includes the security and remote codes in accordance with the dual tone multifrequency (DTMF) signal. When the remote control signal is received by the DTMF receiver 218, it is decoded. The DTMF receiver may comprise an IC such as SSi201, SSi201D or SSi202P available from Silicon Systems Inc., U.S.A. The DTMF receiver has a function for detecting an effective tone pair coded by a telephone line or any other communicating means.

The DTMF receiver effectively distinguishes the DTMF component from the speech signal component. The DTMF receiver receives the security code of the remote control signal which is obtained by the dual tone (DT) while the OGM is being sent to the caller. However, this DTMF receiver tends to operate erroneously while decoding the deck control remote code. In particular, when the dual tone (DT) is generated by the key input of the remote control transmitter through the telephone set, the frequency distribution of the DTMF changes, and the effective tone may not be properly decoded.

For this reason, a speech signal component elimination filter such as a band-pass filter (BPF) can be connected to the input terminal of the DTMF receiver. In this case, the dual tone (DT) can be properly received (decoded). However, an error caused by a speech signal component of the OGM tends to occur.

Figure 21:
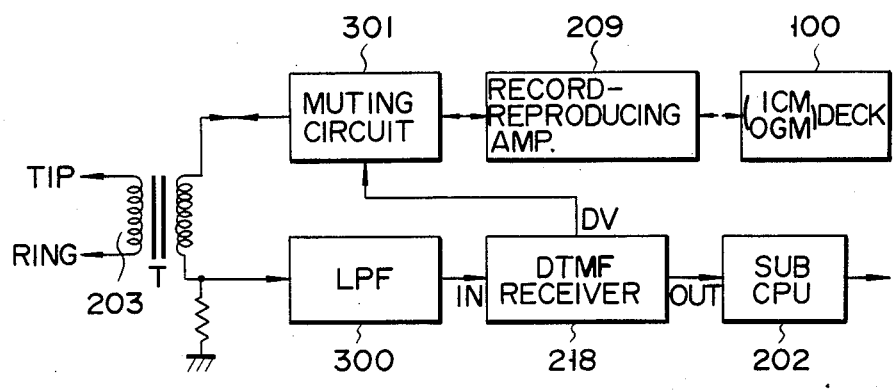
FIG. 21 is a diagram showing the main part of an automatic telephone answering apparatus according to another embodiment of the present invention.

In the second embodiment, as shown in FIG. 21, by utilizing a timing output as DV (data valid) of the DTMF receiver 218, the reproduction or recording signal is temporarily muted even if the same signal component as the DT is included in the OGM or ICM. As a result, an operation error caused by the speech signal component can be eliminated.

FIG. 21 shows the main part of the automatic telephone receiving apparatus according to the second embodiment of the present invention. The same reference numerals as in FIG. 2 denote the same parts as in FIG. 21. An output from one end of a secondary winding of a transformer T included in a telephone line interface 203 is supplied to the DTMF receiver 218 through a low-pass filter (LPF) 300 for cutting off a high frequency of 2.2 kHz or higher. The other terminal of the secondary winding of the transformer T is connected to a record-reproduce amplifier 209 through a muting circuit 301. The record-reproduce amplifier 209 for processing the reproduced and recorded signals with respect to OGM and ICM decks A and B is included in a tape recorder mechanism 100. The DV is supplied as a muting signal from the DTMF receiver 218 to the muting circuit 301. An output from the DTMF receiver 218 is supplied to a sub CPU 202 in the same manner as in FIG. 2.

Figure 22:
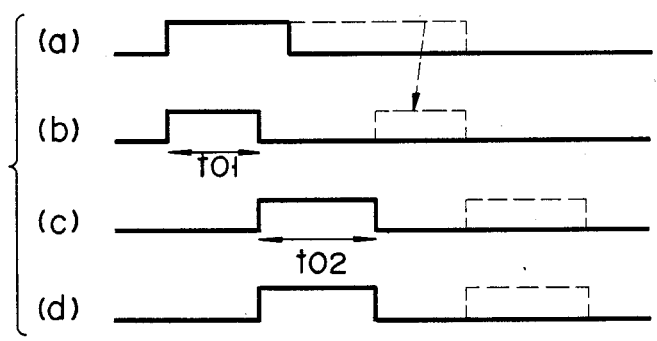
FIG. 22 is a timing chart for explaining the operation of the arrangement shown in FIG. 21.

With this arrangement, while the OGM is being sent to the caller, the DT component included in the OGM speech signal is applied to one end (M) of the muting circuit 301, as shown in FIG. 22(a). In this state, no muting signal is applied, so the DT component is supplied to the DTMF receiver 218 through the transformer T and the filter 300. The DTMF receiver 218 receives a continuous <t01>(e.g., 20 to 40 msec) DT shown in FIG. 22(b) and generates an output for a predetermined period t02 (e.g., 40 to 50 msec) corresponding to the DT input time, as shown in FIG. 22(c). At the same time, as shown in FIG. 22(d), the DTMF receiver 218 also generates the DV signal.

It should be noted that the minimum response time of the sub CPU 202 is set to 50 msec so as not to respond to the output of the time to2 from the DTMF receiver 218.

The DV signal is supplied as the muting signal to the muting circuit 301. Even if a DT component included in the speech signal component continues 60 to 90 msec, this component can be muted. Thus, a DT component exceeding 20 to 40 msec cannot be supplied to the DTMF receiver 218. As a result, an erroneous operation caused by the DT component included in the speech signal component can be completely eliminated. This can also be applied to ICM recording.

In this way the reliability of the remote control operation can be improved, and multiple functions are possible using a simple structure.

A third embodiment will be described wherein reliability of the remote control operation is improved in the same manner as in the second embodiment. FIG. 23 is a block diagram showing the interface connections between an automatic telephone answering apparatus 1 and a telephone line. Referring to FIG. 23, reference numeral 2 denotes a message outputting apparatus comprising a tape recorder or a speech synthesis ROM for generating a message. Reference numeral 3 denotes a record-reproducing apparatus; 4, a controller for generating control signals C1, C2 and C3 to the message outputting apparatus 2 and the record-reproducing apparatus 3 to change the modes of the apparatuses 2 and 3, and for controlling a selector 5 for selecting speech outputs 01 and 02 and a speech input I1; and 6, a telephone line interface. The telephone line interface 6 connects or disconnects an incoming call from a caller to the automatic telephone receiving apparatus 1. The telephone line interface 6 supplies a remote control signal to a decoder 9. This remote control signal is generated while the line is busy. The decoder 9 includes a filter 9a arranged as needed, a detector 9b for receiving the remote signal passing through the filter 9a to generate an effective remote control signal, and a judge circuit 9c. The effective remote control signal from the decoder 9 is supplied to the controller 4. The controller 4 receives a ring detection output from a ring detector 7 included in the telephone line interface 6. The ring detection output is fed back to a hook switch 8.

Each of the controller 4 and the decoder 9 comprises a microprocessor, an interface IC, a RAM, a ROM, etc. A detailed block diagram of the decoder 9 is illustrated in FIG. 24. Referring to FIG. 24, the filter 9a comprises a band-pass filter having as its center frequency a frequency of 2.5 kHz of the remote control signal. An output from the filter 9a is supplied to a comparator 9e through an integrator 9d consisting of a resistor R1 and a capacitor C1. Part of an output from the comparator 9e is supplied to a 4- or 8-bit microprocessor 9g serving as the controller 4 through the interface 9f, e.g., an i8255 used as a serial input interface and available from Intel Corp., U.S.A. The operation of the third embodiment will be described.

In general, when a caller places a call to the automatic telephone answering apparatus 1, a ringing signal is supplied to the apparatus 1 through a telephone exchange. The telephone set directly coupled to the apparatus 1 rings and waits until the called party answers the phone. The automatic telephone answering apparatus 1 detects the incoming call by means of its ring detector 7. The ring detector 7 supplies a detection signal to the controller 4. The controller 4 checks the operating state of the automatic telephone answering apparatus 1. When the controller 4 determines that the call is acceptable, the controller 4 generates an off-hook signal to close the hook switch 8 to enable communication with the caller.

The controller 4 supplies the control signal C1 to the message outputting apparatus 2 which is then set in the message output mode and a predetermined message is sent onto the telephone line in response to the control signal C3 from the controller 4. Normally, after the predetermined message is completed the controller 4 stops generating the control signal C1 and then generates the control signal C2 to set the record-reproducing apparatus 3 in the REC mode. The speech signal from the caller received through the telephone line is recorded for a predetermined period of time in response to the control signal C3. In addition, the controller 4 opens the hook switch 8, so that the automatic telephone answering apparatus 1 prepares for the next incoming call.

The automatic telephone answering apparatus detects a speech receiving enable state when the caller receives the predetermined outgoing message. When the caller has a remote signal generator (or a pushbuttonphone) compatible with the apparatus 1 of the present invention, the remote control signal can be sent by the caller while the caller receives the outgoing message.

The remote control signal sent through the telephone line is received by the decoder 9. A 2.5-kHz control signal and a 2.5-kHz (center frequency) speech burst included in the predetermined message pass through the filter 9a.

The signal including such a speech burst will be processed by the automatic telephone answering apparatus of this embodiment as explained with reference to a series of timing charts shown in FIG. 25.

Figure 25:
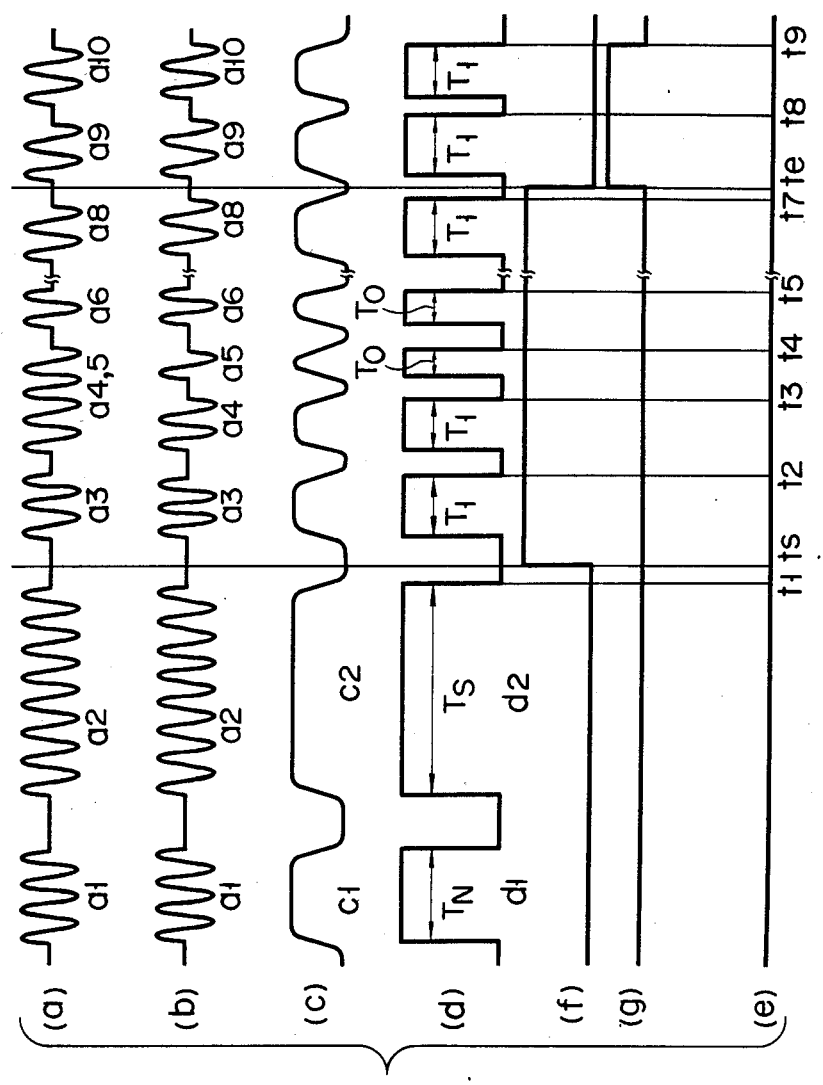
FIG. 25 is a timing chart for explaining the operation of the arrangement shown in FIGS. 23 and 24.

A waveform (a) in FIG. 25 shows the case in which this embodiment is not applied. In the waveform (a), reference symbols a2, a3, a6, a8, a9 and a10 denote control signal bursts; a1, a speech burst; and a4,5, a component obtained such that the speech burst is superposed on the remote control burst.

A waveform (b) shows effective bursts at point A when the present invention is applied. Bursts a1 and a2 are obtained after the component passes through the filter 9a. The bursts a1 and a2 of the waveform (b) are supplied to the integrator 9d which then generates bursts c1 and c2 of a waveform (c). The bursts c1 and c2 are supplied to the comparator 9e which then generates pulses d1 and d2 of a waveform (d). The pulses d1 and d2 are fetched by the CPU 9g through the serial interface 9f. The CPU 9g compares pulse widths Tn and Ts with a predetermined period of time (e.g., 250 ms) in accordance with a series of programs including the serial interface control. In this case, the pulse width Tn is a speech burst having a pulse width of 100 ms or less and is thus neglected. The pulse having the width Tn comprises the start pulse of the remote control signal which has a width of 250 msec or longer. In this case, the microprocessor 9g detects the start pulse. The microprocessor 9g generates the control signals C1 and C3 for stopping generation of the message outputting apparatus 2 at time ts. After the microprocessor 9g thus detects the start pulse, a transfer rate of the control signal is increased, so that a program routine is executed wherein a pulse width T1 (e.g., 100 ms) is decoded as a signal of level "1" and a pulse width T0 (e.g., 50 ms) is decoded as a signal of level "0". The six bits of the security code are detected at times t2, t3, t4, t5 and t7, and the two bits of the remote code are detected at times t8 and t9. When the remote code detection mode (from time ts to time te) is initiated, the burst a4,5 is not present in the waveform (b). The bursts a4 and a5 are separated from each other. Therefore, the above program advances to generate waveforms in an order of the waveforms (e), (f) and (g) (corresponding to the recognition time, the security code detection time, and the remote code detection time, respectively) of FIG. 25. Such a series of remote control signals are continuously effective when they are continuously generated so as to correspond to functions such as REW, PLAY and ERASE functions when the record-reproducing apparatus 3 in the automatic telephone answering apparatus 1 comprises a tape recorder.

When a signal is not generated for longer than a predetermined period of time, the controller 4 determines that the remote control operation has been completed. The controller 4 then sets the automatic telephone answering apparatus 1 in the A.ANS or A.ONL mode.

According to the third embodiment, in the automatic telephone receiving apparatus which performs speech communication through the telephone line and which is controlled in response to the remote control signal, when a speech signal is mixed as a crosstalk component with the remote control signal, in order to prevent the speech component from being detected as a spurious control signal, a signal having a burst pulse width which does not correspond to that of the speech burst is detected as the effective signal. The effective signal is used as the start component of the control signal, thereby properly detecting the reception of the control signal and hence contributing to improvement of reliability of the remote control operation.

In this case, when the specific burst pulse width is made sufficiently longer than that of a speech burst produced by a voice, reliability can be further improved. However, if this pulse is used as a unit signal, the signal transfer rate is decreased. According to the present invention, the crosstalk speech component can be cut off by detecting the first effective control signal. Thereafter, the decoder can be operated under the condition wherein the message is not present. A burst (or pulse) having a pulse width shorter than the unit burst (or pulse) can be used as the control signal.

In the third embodiment, the pulse width of the start pulse is longer than pulse widths of possible speech bursts. However, the pulse width of the start pulse may be shorter than pulse widths of possible speech bursts. In this case, the subsequent control pulse must have a longer pulse width that that of the start pulse in order to prevent errors since the pulse train of the remote control signal is important. In this case, the transfer rate is low, but errors can be greatly decreased. The record-reproducing apparatus may comprise an arrangement for A/D-converting the analog speech signal and recording the resultant digital speech signal, or an arrangement for directly recording the digital speech signal.

According to the third embodiment, in an automatic telephone answering apparatus having a message outputting apparatus, which sends an outgoing message to the caller, and a record-reproducing apparatus, when the controller for selectively switching the message outputting apparatus and the record-reproducing apparatus in the predetermined modes is controlled in response to the remote control signal transmitted through the telephone line, the remote signal decoder does not decode a spurious component of the speech message since the pulse width of the start pulse in the remote control signal does not fall within the widths of possible speech message components even if the remote control signal is sent while the outgoing message is being sent to the caller. The discrete components constituting a 2.5-kHz continous remote control signal are transmitted at predetermined intervals. According to an experiment, the maximum pulse width of speech bursts passing through a band-pass filter having a speech signal band of 2.3 to 2.8 kHz was measured to be about 100 ms.

In the third embodiment, the decoder is arranged to detect 2.5-kHz bursts (having a pulse width of 300 ms which is three times that of the measured maximum pulse width) as the start pulse of the remote control signal. The decoder continuously decodes the security code following the start pulse. In this case, the security code and the subsequent code must not comprise pulses having longer pulse widths. Therefore, when the decoder detects the start pulse of the remote control signal, the OGM output is stopped when the start pulse is detected. Thereafter, the decoder can decode codes having increased transfer rates.

In addition to the functions described above, additional functions (modes) provided especially in the first embodiment will be described.

(1) Last Message Alarm Rec

According to this function, the last message can be detected during ICM reproduction in such a manner that a 2-kHz marker signal from the main CPU 201 is recorded in correspondence with the last message before the ICM deck is set in the remote control REW mode. When the last message is detected, the marker signal is erased. The tape in the ICM deck is rewound and is ready for subsequent ICM recording.

(2) Remote Control Reception Alarm

According to this function, when the A.ONL and A.ANS modes are switched in response to the remote control signal, the main CPU 201 generates a reception alarm (voice signal) to the remote control operator so as to indicate that the mode switching is completed.

(3) Stop Time Prolongation

This function provides a time margin by setting the corresponding deck in the STOP mode when a given mode is changed to another mode in the remote control operation. An intermediate alarm signal is generated from the main CPU 201 within 6 seconds after the STOP mode is set, thereby indicating to the caller that the corresponding deck is in the STOP mode. Thereafter, the caller depresses the STOP key in the remote control unit to prolong the stop time.

(4) Remote Control Reception Alarm

According to this function, the main CPU 201 generates a remote control reception alarm (voice signal) only when a received 3-digit security code coincides with that stored in the memory in the remote control operation, thereby signaling to the caller the state wherein the remote control operation is initiated.

In remote control operation, the keys for controlling the A and B tape decks of the DTMF answering apparatus are pressed, and the main unit decodes the control code. When this decoded control code is received, a beeping sound is heard on the remote control side. These beeps, which correspond to the various operations of the keys, can be made short/long, repetitive, and the period can be adjusted. The following is an example of a possible setting:

| | |
|---|---|
| AUTO ANSWER | 1 kHz, 2 sec on |
| ANNOUNCE ONLY | 1 kHz, 1 sec on, 0.5 sec off, 1 sec on |
| REWIND | 1 kHz, 0.25 sec on, 0.5 sec off, repeat |
| SKIP | 1 kHz, 0.5 sec on, 1 sec off, 3 repeats |
| BACK SPACE | 2 kHz, 3 sec, once |
| STOP | 2 kHz, 0.5 sec, once, after 6 sec, |
| | 2 kHz, 0.5 sec, once, followed by |
| | 6 sec off. |

To extend the stop mode, it is possible to maintain the STOP mode for 12 seconds by pressing the STOP key again during the latter part of the 6 second off period.

The present invention is not limited to the above embodiments. Various changes and modifications may be made without departing from the scope of the invention.

According to the present invention, therefore, a simple multifunction automatic telephone answering apparatus can be provided.

What is claimed is:

1. An apparatus for remotely controlling a tape recorder by way of a telephone line, comprising:
   first means including tape recorder means having signal lines for recording and reproducing a speech signal received through said telephone line;
   second means including processing means for controlling and setting said first means in a selected recording/reproducing mode of operation; and
   third means for decoding a remote control signal received through said telephone line, and for supplying a decoded remote control signal to said second means, said third means comprising microcomputer means;
   a telephone line interface for receiving/transmitting the speech signal and the remote control signal, said remote control signal comprising a dual tone signal;
   a dual tone multifrequency (DTMF) receiver for processing a dual tone signal from said telephone line interface and for generating (a) an output signal to said microcomputer means, said output signal corresponding to said remote control signal, and (b) a timing signal of a predetermined pulse width in synchronized relation with the output signal; and
   a muting circuit arranged between said telephone line interface and said signal lines of said tape recorder means for receiving said timing signal and for muting control signals from said telephone line interface to said tape recorder means in response to said timing signal from said DTMF receiver;
   wherein said microcomputer means is arranged so that its minimum response time to the output signal from said DTMF receiver is longer than the pulse width of said timing signal from said DTMF receiver.

2. An apparatus according to claim 1, wherein said second means comprises: a main microcomputer; and a sub microcomputer, powered by a backup battery, for setting, storing and displaying a security code of the remote control signal with respect to said main microcomputer, said sub microcomputer displaying the security code only in response to an instruction from said main microcomputer.

3. An apparatus according to claim 1, wherein said second means is arranged to output an attention getting signal when a new operation mode is selected for said first means.

4. An apparatus according to claim 1, wherein said first means comprises an incoming message (ICM) tape deck, said second means being arranged to output an attention getting signal, and to request a message for ICM after said attention getting signal is stopped.

5. An apparatus according to claim 1, wherein the remote control signal received by said third means includes a start code aqd a security code added to the start code, the security code having a plurality of bits in a serial form representing a specific code.

6. An apparatus according to claim 1, wherein the remote control signal received by said third means includes a start code and a remote code added to the start code, the remote code having a plurality of bits in a serial form corresponding to at least two of the predetermined modes.

7. An apparatus according to claim 4, including an outgoing message (OGM) tape deck for sending a prerecorded speech message out through said telephone line, and wherein said second means includes a motor controller for supplying three motor control signals to a single motor in predetermined high-and low-level combinations corresponding to a selected operation mode, said single motor being commonly used for said outgoing and said incoming message tape decks.

8. An apparatus according to claim 4, including an outgoing message (OGM) tage deck for sending a prerecorded speech message out through said telephone line, and wherein said second means comprises: first switching control means for setting said outgoing and said incoming message tape decks in an auto answer or announce only mode; tape end detecting means for detecting a tape end in said incoming message tape deck in the auto answer mode set by said first switching control means; and second switching control means for automatically setting said apparatus in the announce only mode in response to a detection signal from said tape end detecting means.

9. An apparatus according to claim 1, wherein said second means is capable of recording an attention getting signal after a final speech signal is recorded by said first means.

10. An apparatus according to claim 1, wherein said second means includes means to generate an attention getting signal through said telephone line when said third means decodes the remote control signal.

11. An apparatus according to claim 10, wherein said attention getting signal is generated in accordance with the kind of the remote control signal.

12. An apparatus according to claim 1, wherein said second means is capable of recording an output signal from a built-in microphone for a MEMO RECORD function as a dictating machine, and is capable of recording an attention getting signal after said MEMO RECORD.

13. An apparatus according to claim 1, wherein said second means is arranged to control said first means to record voices of parties communicating with one another by said telephone line for a PHONE (2-WAY) recording, and to record an attention getting signal after said PHONE recording.

14. An apparatus according to claim 1, including means for sending a prerecorded speech message out through said telephone line in response to a control signal from said second means.

15. An apparatus for remotely controlling a tape recorder by way of a telephone line, comprising:
   first means including tape recorder means having signal lines for recording and reproducing a speech signal received through said telephone line;
   second means including processing means for controlling and setting said first means in a selected recording/reproducing mode of operation; and
   third means for decoding a remote control signal received through said telephone line, and for supplying a decoded remote control signal to said second means, said third means comprising
   microcomputer means;
   a telephone line interface for receiving/transmitting the speech signal and the remote control signal, said remote control signal comprising a dual tone signal;
   a dual tone multifrequency (DTMF) receiver for processing a dual tone signal from said telephone line interface and for generating (a) an output signal to said microcomputer means, said output signal corresponding to said remote control signal, and (b) a timing signal of a predetermined pulse width in synchronized relation with the output signal; and
   a muting circuit arranged between said telephone line interface and said signal lines of said tape recorder means for receiving said timing signal and for muting control signals from said telephone line interface to said tape recorder means in response to said timing signal from said DTMF receiver;
   wherein said microcomputer means is arranged so that its minimum response time to the output signal from said DTMF receiver is longer than the pulse width of said timing signal from said DTMF receiver;
   wherein said speech signal comprises speech bursts of known pulse widths, and said third means includes means for decoding as a start pulse a pulse having a pulse width different from the known pulse widths of the speech bursts included in the speech signal, said start pulse occupying an initial position in said remote control signal.

16. An apparatus according to claim 15, wherein the pulse width of the start pulse of the remote control signal is longer than a known maximum pulse width of the speech bursts included in the speech message.

17. An apparatus according to claim 15, wherein said second means stops generating the speech signal in response to the start pulse.

18. An apparatus according to claim 15, wherein said second means stops generating the speech signal in response to the start pulse and changes a transfer rate of subsequent pulses of a pulse train forming the remote control signal.

19. An apparatus according to claim 16, wherein said third means decodes, as said remote control signal, a pulse train having pulse widths shorter than that of the start pulse initiating the pulse train.

20. An apparatus for remotely controlling a tape recorder by way of a telephone line, comprising:
   first means including tape recorder means having signal lines for recording and reproducing a speech signal received through said telephone line;
   second means including processing means for controlling and setting said first means in a selected recording/reproducing mode of operation; and
   third means for decoding a remote control signal received through said telephone line, and for supplying a decoded remote control signal to said second means, said third means comprising
   microcomputer means;
   a telephone line interface for receiving/transmitting the speech signal and the remote control signal, said remote control signal comprising a dual tone signal;
   a dual tone multifrequency (DTMF) receiver for processing a dual tone signal from said telephone line interface and for generating (a) an output signal to said microcomputer means, said output signal corresponding to said remote control signal, and (b) a timing signal of a predetermined pulse width in synchronized relation with the output signal; and
   a muting circuit arranged between said telephone line interface and said signal lines of said tape recorder means for receiving said timing signal and for muting control signals from said telephone line interface to said tape recorder means in response to said timing signal from said DTMF receiver;
   wherein said microcomputer means is arranged so that its minimum response time to the output signal from said DTMF receiver is longer than the pulse width of said timing signal from said DTMF receiver;
   said second means being arranged so that a stop mode is first set when a new mode is to be selected upon decoding of a remote control signal by said third means, and an attention getting signal is generated during a certain time interval of said stop mode, and wherein said stop mode is prolonged when a remote control signal corresponding to said stop mode is decoded by said third means after said attention getting signal is generated.

21. An apparatus according to claim 20, including means for sending a prerecorded speech messgge out through said telephone line in response to a control signal from said second means.

* * * * *

UNITED STATES PATENT AND TRADEMARK OFFICE
CERTIFICATE OF CORRECTION

PATENT NO. : 4,700,376

DATED : October 13, 1987

INVENTOR(S) : OHYA et al

It is certified that error appears in the above-identified patent and that said Letters Patent is hereby corrected as shown below:

Title page, left-hand column, under Foreign Application Priority Date, "59-2066660" should be -- 59-206660 --.

Signed and Sealed this

Eighth Day of November, 1988

Attest:

DONALD J. QUIGG

Attesting Officer

Commissioner of Patents and Trademarks